(12) United States Patent
Zhang et al.

(10) Patent No.: US 11,709,975 B2
(45) Date of Patent: Jul. 25, 2023

(54) METHOD FOR DETERMINING PARAMETERS OF HIGH-FREQUENCY VIBRATING MILL WITH THREE GRINDING DRUMS

(71) Applicant: Northeastern University, Liaoning (CN)

(72) Inventors: Xueliang Zhang, Liaoning (CN); Chao Li, Liaoning (CN); Shiju Cui, Liaoning (CN); Zhiguo Gao, Liaoning (CN); Hongliang Yue, Liaoning (CN); Zhenmin Li, Liaoning (CN); Hui Ma, Liaoning (CN)

(73) Assignee: NORTHEASTERN UNIVERSITY, Liaoning Province (CN)

( * ) Notice: Subject to any disclaimer, the term of this patent is extended or adjusted under 35 U.S.C. 154(b) by 533 days.

(21) Appl. No.: 17/045,938

(22) PCT Filed: Sep. 12, 2019

(86) PCT No.: PCT/CN2019/105529
§ 371 (c)(1),
(2) Date: Oct. 7, 2020

(87) PCT Pub. No.: WO2020/125088
PCT Pub. Date: Jun. 25, 2020

(65) Prior Publication Data
US 2021/0173974 A1 Jun. 10, 2021

(30) Foreign Application Priority Data
Dec. 17, 2018 (CN) .......................... 201811545900.9

(51) Int. Cl.
*G06F 30/20* (2020.01)
*B02C 25/00* (2006.01)
(Continued)

(52) U.S. Cl.
CPC .............. *G06F 30/20* (2020.01); *B02C 17/14* (2013.01); *B02C 25/00* (2013.01); *G06F 2111/10* (2020.01)

(58) Field of Classification Search
CPC ...... G06F 30/20; G06F 2111/10; B02C 25/00; B02C 17/14
See application file for complete search history.

(56) References Cited

U.S. PATENT DOCUMENTS 9,990,333 B1 * 6/2018 Reed .......................... A61F 2/60

FOREIGN PATENT DOCUMENTS

CN 101662248 A 3/2010
CN 104809342 A 7/2015
(Continued)

OTHER PUBLICATIONS

Altun, Deniz. "Mathematical modelling of vertical roller mills." (Year: 2017).*

*Primary Examiner* — Chuen-Meei Gan
(74) *Attorney, Agent, or Firm* — Muncy, Geissler, Olds & Lowe, P.C.

(57) ABSTRACT

A method for determining parameters of a high-frequency vibrating mill with three grinding drums is disclosed. The mathematic modeling is established by applying the average parameter method and transfer function method; the synchronization-stability capability coefficient curve, and the dimensionless coupling torque maximum value diagram of the system are obtained by the characteristic analysis of synchronization and stability. Finally, the curves of rotational velocity of motors, displacements of mass bodies, and phase difference between exciters are obtained by the simulation, and the correctness of the method is verified by the comparison of characteristic analysis and simulation. The parameters of the high-frequency vibrating mill of the present invention can lower the technical requirements of (Continued)

exciters, reduce the loss of the exciters, increase the service life of the mill.

2 Claims, 22 Drawing Sheets

(51) Int. Cl.
    *G06F 111/10*     (2020.01)
    *B02C 17/14*     (2006.01)

(56) References Cited

FOREIGN PATENT DOCUMENTS

| | | |
|---|---|---|
| CN | 105426564 A | 3/2016 |
| CN | 107187810 A | 9/2017 |
| CN | 107252780 A | 10/2017 |
| CN | 109499697 A | 3/2019 |
| DE | 102007024510 B3 | 9/2008 |
| EP | 0558135 B1 | 6/1996 |

* cited by examiner

METHOD FOR DETERMINING PARAMETERS OF HIGH-FREQUENCY VIBRATING MILL WITH THREE GRINDING DRUMS

TECHNICAL FIELD

The present invention belongs to the technical field of vibrating mill device and relates to a method for determining parameters of a high-frequency vibrating mill with three grinding drums.

BACKGROUND

A vibrating mill is an ultra-fine crushing device with balls or rods as the medium, which can grind 2 mm materials to several microns. The vibrating mill has the advantages of high efficiency, energy-saving, space-saving, uniform particle size, etc., which plays an important role in the field of ultra-fine crushing, and has been widely used in engineering. The working principle of the vibrating mill is to make a drum body vibrate at a high frequency by an exciting force generated by the eccentric block and crush material by a grinding medium.

The present invention is a mill with three grinding drums, which can work at high frequency to achieve finer grinding. The number of exciters used in an ordinary mill is generally less than three. Compared with the ordinary mill, the present invention has the following advantages:

1. To motivate the total vibrating system, the requirements for exciters are generally strict in the system with a small number of exciters. This is because that to ensure the rated power, the technical requirements of the exciters are very high. Whereas the present invention uses three exciters, which lowers the technical requirements of exciters, reduces the loss of the exciters, and increases the service life of the mill while ensuring that the rated power and standard working requirements are met.

2. The present invention uses three motors for driving, which can work at a high frequency. When the three motors resonate, a high amplitude can be reached, so that the mill has a better crushing effect, small noise, no pollution, and high reliability.

SUMMARY

Taking a dynamic model with four mass bodies driven by three exciters as the research object, the mathematic modeling of the system is established by the average parameter method and transfer function method. Besides, the characteristic curves of synchronization and stability capability coefficient, the dimensionless coupling torque maximum, are obtained by characteristic analysis of synchronization and stability. Finally, the curves of the rotational velocity of the motors, phase difference between the exciters, and displacements of the mass bodies are obtained by simulation. By the comparison between the characteristic analysis and simulation, the correctness of the method is verified.

The present invention has the following specific technical solution:

A method for determining parameters of a high-frequency vibrating mill with three grinding drums, wherein a dynamic model of the vibrating mill comprises three exciters, four mass bodies, and springs; mass body 1, mass body 2, and mass body 3 are respectively three grinding drums connected with mass body 4 through springs, and mass body 4 is connected with a base through spring; the three exciters are respectively located on mass body 1, mass body 2 and mass body 3; the three exciters rotate in the same direction, and each exciter rotates about its own rotation axis; a method for determining parameters of the exciters, comprising the following steps:

Step 1: Establishing a Dynamic Model and the Motion Differential Equations of the System A dynamic model of the vibrating mill is shown in FIG. 1. Establishing two rectangular coordinate systems, the three exciters rotate in the same direction, and the motion of the mill body is divided into vibration in x and y directions and oscillation around the mass center, represented by x, y and ψ respectively.

Selecting x, y, ψ, $\varphi_1$, $\varphi_2$ and $\varphi_3$ as generalized coordinates, solving the kinetic energy, potential energy, and energy dissipation functions of a system, and substituting the functions into Lagrange equations to obtain motion differential equations of the system.

$$M_1\ddot{x}_1 + f_1(\dot{x}_1 - \dot{x}_4) + k_1(x_1 - x_4) = m_{01}r(\dot{\varphi}_1^2\cos\varphi_1 + \ddot{\varphi}_1\sin\varphi_1) \quad (1)$$

$$M_2\ddot{x}_2 + f_2(\dot{x}_2 - \dot{x}_4) + k_2(x_2 - x_4) = m_{02}r(\dot{\varphi}_2^2\cos\varphi_2 + \ddot{\varphi}_2\sin\varphi_2)$$

$$M_3\ddot{x}_3 + f_3(\dot{x}_3 - \dot{x}_4) + k_3(x_3 - x_4) = m_{03}r(\dot{\varphi}_3^2\cos\varphi_3 + \ddot{\varphi}_3\sin\varphi_3)$$

$$M_4\ddot{x}_4 - f_1(\dot{x}_1 - \dot{x}_4) - k_1(x_1 - x_4) - f_2(\dot{x}_2 - \dot{x}_4) -$$
$$k_2(x_2 - x_4) - f_3(\dot{x}_3 - \dot{x}_4) - k_3(x_3 - x_4) + f_4\dot{x}_4 + k_4x_4 = 0$$

$$M_1\ddot{y}_1 + f_1(\dot{y}_1 - \dot{y}_4) + k_1(y_1 - y_4) = m_{01}r(\dot{\varphi}_1^2\sin\varphi_1 - \ddot{\varphi}_1\cos\varphi_1)$$

$$M_2\ddot{y}_2 + f_2(\dot{y}_2 - \dot{y}_4) + k_2(y_2 - y_4) = m_{02}r(\dot{\varphi}_2^2\sin\varphi_2 - \ddot{\varphi}_2\cos\varphi_2)$$

$$M_3\ddot{y}_3 + f_3(\dot{y}_3 - \dot{y}_4) + k_3(y_3 - y_4) = m_{03}r(\dot{\varphi}_3^2\sin\varphi_3 - \ddot{\varphi}_3\cos\varphi_3)$$

$$M_4\ddot{y}_4 - f_1(\dot{y}_1 - \dot{y}_4) - k_1(y_1 - y_4) - f_2(\dot{y}_2 - \dot{y}_4) -$$
$$k_2(y_2 - y_4) - f_3(\dot{y}_3 - \dot{y}_4) - k_3(y_3 - y_4) + f_4\dot{y}_4 + k_4y_4 = 0$$

$$J\ddot{\psi} + f_\psi\dot{\psi} + k_\psi\psi = l_0r\sum_{i=1}^{3}m_i[\ddot{\varphi}_i\cos(\varphi_i - \beta_i) - \dot{\varphi}_i^2\sin(\varphi_i - \beta_i)]$$

$$J_{oi}\ddot{\varphi}_i + f_{di}\dot{\varphi}_i =$$
$$m_{oi}r[\ddot{y}_i\cos\varphi_i - \ddot{x}_i\sin\varphi_i - l_0\ddot{\psi}\cos(\varphi_i - \beta_i) + l_0\dot{\psi}^2\sin(\varphi_i - \beta_i)]$$

wherein $m_{0i}$—mass of each exciter (i=1~3); $m_i$—mass of each mass body (i=1~4);

$M_1 = m_1 + m_{01}$, $M_2 = m_2 + m_{02}$, $M_3 = m_3 + m_{03}$, and $M_4 = m_4 + m_{01} + m_{02} + m_{03}$ $J_\psi = J_{m4} + (m_{01} + m_{02} + m_{03})(r^2 + l^2)$—moment of inertia of a vibrating rigid body;

$J_{oi} = m_{oi}r_i^2$—moment of inertia of each exciter (i=1~3);

$$k_\psi = \frac{1}{2}k_4(l_{x3}^2 + l_{y3}^2),$$

$k_i$(i=1~4)—spring stiffness coefficient;

$$f_\psi = \frac{1}{2}(f_1 + f_2 + f_3)(l_{x1}^2 + l_{x2}^2 + l_{y1}^2 + l_{y2}^2) + \frac{1}{2}f_4(l_{x3}^2 + l_{y3}^2),$$

$f_i$(i=1~4)—damping coefficient;

$$\varphi_{0i} = \frac{1}{2}(f_1 + f_2 + f_3)(l_{x1}l_{x2} + l_{y1}l_{y2})$$

phase angle of exciter i (i=1~3); $\dot{\varphi}_i$—angular velocity of exciter i (i=1~3); $\ddot{\varphi}_i$—angular acceleration of exciter i (i=1~3);

Step 2: Synchronization Analysis

Letting the phase difference between exciter 1 and exciter 2 be $2\alpha_1$, the phase difference between exciter 2 and exciter 3 be $2\alpha_2$, and the average phase difference among the three exciters be φ.

$$\varphi_1 - \varphi_2 = 2\alpha_1, \quad \varphi_2 - \varphi_3 = 2\alpha_2, \quad \varphi = \frac{1}{3}\sum_{i=1}^{3}\varphi_i$$

Rearranging the above equations to obtain $$\varphi_1 = \varphi + \frac{4}{3}\alpha_1 + \frac{2}{3}\alpha_2 = \varphi + \upsilon_1 \tag{2}$$

$$\varphi_2 = \varphi - \frac{2}{3}\alpha_1 + \frac{2}{3}\alpha_2 = \varphi + \upsilon_2$$

$$\varphi_3 = \varphi - \frac{2}{3}\alpha_1 - \frac{4}{3}\alpha_2 = \varphi + \upsilon_3$$

Using the transfer function method to obtain the response of the system:

$$x_1 = F_1 r\cos(\varphi_1 - \gamma_1) + F_5 r\cos(\varphi_2 - \gamma_5) + F_9 r\cos(\varphi_3 - \gamma_9) \tag{3}$$

$$x_2 = F_2 r\cos(\varphi_1 - \gamma_2) + F_6 r\cos(\varphi_2 - \gamma_6) + F_{10} r\cos(\varphi_3 - \gamma_{10})$$

$$x_3 = F_3 r\cos(\varphi_1 - \gamma_3) + F_7 r\cos(\varphi_2 - \gamma_7) + F_{11} r\cos(\varphi_3 - \gamma_{11})$$

$$x_4 = F_4 r\cos(\varphi_1 - \gamma_4) + F_8 r\cos(\varphi_2 - \gamma_8) + F_{12} r\cos(\varphi_3 - \gamma_{12})$$

$$y_1 = F_1 r\sin(\varphi_1 - \gamma_1) + F_5 r\sin(\varphi_2 - \gamma_5) + F_9 r\sin(\varphi_3 - \gamma_9)$$

$$y_2 = F_2 r\sin(\varphi_1 - \gamma_2) + F_6 r\sin(\varphi_2 - \gamma_6) + F_{10} r\sin(\varphi_3 - \gamma_{10})$$

$$y_3 = F_3 r\sin(\varphi_1 - \gamma_3) + F_7 r\sin(\varphi_2 - \gamma_7) + F_{11} r\sin(\varphi_3 - \gamma_{11})$$

$$y_4 = F_4 r\sin(\varphi_1 - \gamma_4) + F_8 r\sin(\varphi_2 - \gamma_8) + F_{12} r\sin(\varphi_3 - \gamma_{12})$$

$$\psi = \frac{r_m r_l r}{\mu_\psi l_e}\sum_{i=1}^{3}\sin(\varphi_i - \beta_i + \gamma_{13})$$

Determining intermediate parameters:

$$a = M_4 M_0^3 \omega_{m0}^8 - \tag{4}$$
$$(3f_0^2 M_4 M_0 + 9f_0^2 M_0^2 + 3k_0 M_0^3 + 3M_4 M_0^2 k_0 + k_4 M_0^3)\omega_{m0}^6 + (3f_0^2 k_4 M_0 + 6k_0^2 M_0^2 + 15f_0^2 k_0 M_0 + 3M_4 M_0 k_0^2 + f_0^4 + 3k_4 M_0^2 k_0 + 3f_0^2 M_4 k_0)\omega_{m0}^4 -$$
$$(3f_0^2 k_0^2 + 3k_4 M_0 k_0^2 + M_4 k_0^3 + 3k_0^3 M_0 + 3f_0^2 k_4 k_0)\omega_{m0}^2 + k_4 k_0^3$$

$$b = -(3M_4 M_0^2 f_0 + 4f_0 M_0^3)\omega_{m0}^7 + (6M_4 M_0 k_0 f_0 + 15f_0 M_0^2 k_0 + 3k_4 M_0^2 f_0 + 6f_0^3 M_0 + f_0^3 M_4)\omega_{m0}^5 - (6k_4 M_0 k_0 f_0 + 12f_0 k_0^2 M_0 + 3f_0^3 k_0 + 3M_4 k_0^2 f_0 + f_0^3 k_4)\omega_{m0}^3 + (f_0 k_0^3 + 3k_4 k_0^2 f_0)\omega_{m0}$$

$$c_1 = -M_4 M_0^2 \omega_{m0}^6 + (2M_4 M_0 k_0 + 3k_0 M_0^2 + f_0^2 M_4 + 6f_0^2 M_0 + k_4 M_0^2)\omega_{m0}^4 - (M_4 k_0^2 + 4k_0^2 M_0 + 2k_4 M_0 k_0 + f_0^2 k_4 + 5f_0^2 k_0)\omega_{m0}^2 + k_4 k_0^2 + k_0^3$$

$$d_1 = 2f_0 M_4 M_0 + 4f_0 M_0^2)\omega_{m0}^5 - (2f_0 k_4 M_0 + 2f_0 M_4 k_0 + 2f_0^3 + 10f_0 M_0 k_0)\omega_{m0}^3 + 2f_0 k_4 k_0 + 4f_0 k_0^2$$

$$e_1 = f_0^2 M_0 \omega_{m0}^4 - (k_0^2 M_0 + 3f_0^2 k_0)\omega_{m0}^2 + k_0^3$$

$$f_1 = -(2f_0 M_0 k_0 + f_0^3)\omega_{m0}^3 + 3f_0 k_0^2 \omega_{m0}$$

$$h_1 = f_0^2 M_0 \omega_{m0}^4 - (k_0^2 M_0 + 3f_0^2 k_0)\omega_{m0}^2 + k_0^3$$

$$p_1 = -(2f_0 M_0 k_0 + f_0^3)\omega_{m0}^3 + 3f_0 k_0^2 \omega_{m0}$$

$$u_1 = (k_0 M_0^2 + 2f_0^2 M_0)\omega_{m0}^4 - (3f_0^2 k_0 + 2k_0^2 M_0)\omega_{m0}^2 + k_0^3$$

$$z_1 = f_0 M_0^2 \omega_{m0}^5 - (f_0^3 + 4f_0 M_0 k_0)\omega_{m0}^3 + 3f_0 k_0^2 \omega_{m0}$$

$c_2 = e_1, d_2 = f_1, e_2 = c_1, f_2 = d_1, h_2 = e_1, p_2 = f_1, u_2 = u_1, z_2 = z_1,$ $c_3 = e_1, d_3 = f_1, e_3 = e_1, f_2 = f_1, h_3 = c_1, p_3 = d_1, u_3 = u_1, z_3 = z_1$ $$\gamma_1 = \begin{cases} \arctan\dfrac{bc_1 - ad_1}{ac_1 + bd_1}, & ac_1 + bd_1 > 0 \\ \pi + \arctan\dfrac{bc_1 - ad_1}{ac_1 + bd_1}, & ac_1 + bd_1 < 0 \end{cases},$$

$$\gamma_2 = \begin{cases} \arctan\dfrac{be_1 - af_1}{ae_1 + bf_1}, & ae_1 + bf_1 > 0 \\ \pi + \arctan\dfrac{be_1 - af_1}{ae_1 + bf_1}, & ae_1 + bf_1 < 0 \end{cases}$$

$$\gamma_3 = \begin{cases} \arctan\dfrac{bh_1 - ap_1}{ah_1 + bp_1}, & ah_1 + bp_1 > 0 \\ \pi + \arctan\dfrac{bh_1 - ap_1}{ah_1 + bp_1}, & ah_1 + bp_1 < 0 \end{cases},$$

$$\gamma_4 = \begin{cases} \arctan\dfrac{bu_1 - az_1}{az_1 + bu_1}, & az_1 + bu_1 > 0 \\ \pi + \arctan\dfrac{bu_1 - az_1}{az_1 + bu_1}, & az_1 + bu_1 < 0 \end{cases}$$

$\gamma_5 = \gamma_2, \gamma_6 = \gamma_1, \gamma_7 = \gamma_2,$
$\gamma_8 = \gamma_4, \gamma_9 = \gamma_2, \gamma_{10} = \gamma_2, \gamma_{11} = \gamma_1, \gamma_{12} = \gamma_4$ wherein $\gamma_i$(i=1~4)—lag angle;

$$M = \begin{pmatrix} M_0 & & & \\ & M_0 & & \\ & & M_0 & \\ & & & M_4 \end{pmatrix}, \tag{5}$$

$$K = \begin{pmatrix} k_0 & & & -k_0 \\ & k_0 & & -k_0 \\ & & k_0 & -k_0 \\ -k_0 & -k_0 & -k_0 & 3k_0 + k_4 \end{pmatrix}$$

$$\Delta(\omega^2) = \begin{pmatrix} k_0 - M_0\omega^2 & & & -k_0 \\ & k_0 - M_0\omega^2 & & -k_0 \\ & & k_0 - M_0\omega^2 & -k_0 \\ -k_0 & -k_0 & -k_0 & 3k_0 + k_4 - M_0\omega^2 \end{pmatrix}$$

wherein, M—mass coupling matrix, K—stiffness coupling matrix, and $\Delta(\omega^2)$ is an eigenvalue equation.

Letting the eigenvalue equation be equal to 0, i.e., $\Delta(\omega^2)=0$:

$$k_0^3 k_4 - k_0^3 \omega_{m0}^2 M_4 - 3\omega_{m0}^2 M_0 k_0^3 - 3k_0^2 \omega_{m0}^2 M_0 k_4 + 3k_0^2 \omega_{m0}^4 M_0 M_4 + 6\omega_{m0}^4 M_0^2 k_0^2 + 3k_0 \omega_{m0}^4 M_0^2 k_4 - 3k_0 \omega_{m0}^6 M_0^2 M_4 - 3\omega_{m0}^6 M_0^3 k_0 - \omega_{m0}^6 M_0^3 k_4 + \omega_{m0}^8 M_0^3 M_4 = 0$$

Obtaining inherent frequency:

$$\omega_1 = \omega_2 = \omega_0 = \sqrt{\frac{k_0}{M_0}} \tag{6}$$

$$\omega_3 = \sqrt{\frac{3M_0k_0 + k_0M_4 + k_0M_4 + \sqrt{(3M_0k_0 + k_0M_4)^2 + M_0k_4(6M_0k_0 + M_0k_4 - 2k_0M_4)}}{M_0M_4}}$$

$$\omega_4 = \sqrt{\frac{3M_0k_0 + k_0M_4 + k_0M_4 - \sqrt{(3M_0k_0 + k_0M_4)^2 + M_0k_4(6M_0k_0 + M_0k_4 - 2k_0M_4)}}{M_0M_4}}$$

When the three exciters can operate synchronously, $\dot{\varphi}=\omega_{m0}$. Taking the second derivative of $x_1$, $x_2$, $x_3$, $y_1$, $y_2$, $y_3$ and $\psi$ to time t, which are substituted into the equations with respect to $\varphi_i$ in Eq. (1), and then integrating the equations on $\varphi=0\sim2\pi$, after taking the average value and arranging the equations, the equilibrium equations of the three exciters are obtained as follows:

$$T_{e01} - f_{01}\omega_{m0} = \overline{T}_{L1}$$

$$T_{e02} - f_{02}\omega_{m0} = \overline{T}_{L2}$$

$$T_{e03} - f_{03}\omega_{m0} = \overline{T}_{L3} \quad (7)$$

wherein $\overline{T}_{L1} = T_u\{2F_2[\sin(2\alpha_1+2\alpha_2)+\sin(2\alpha_1)]\cos\gamma_2+2F_2[\cos(2\alpha_1+2\alpha_2)+\cos(2\alpha_1)]\sin\gamma_2-l_0F_{13}[\sin(2\alpha_1+2\alpha_2-\beta_1+\beta_3)+\sin(2\alpha_1-\beta_1+\beta_2)]\cos\gamma_{13}+2F_1\sin\gamma_1-l_0F_{13}[\cos(2\alpha_1+2\alpha_2-\beta_1+\beta_3)+\cos(2\alpha_1-\beta_1+\beta_2)]\sin\gamma_{13}-l_0F_{13}\sin\gamma_{13}\}$ $\overline{T}_{L2} = T_u\{2F_2[\sin(2\alpha_2)-\sin(2\alpha_1)]\cos\gamma_2+2F_2[\cos(2\alpha_2)+\cos(2\alpha_1)]\sin\gamma_2+l_0F_{13}[\sin(2\alpha_1-\beta_1+\beta_2)-\sin(2\alpha_2-\beta_2+\beta_3)]\cos\gamma_{13}+2F_1\sin\gamma_1-l_0F_{13}[\cos(2\alpha_1-\beta_1+\beta_3)+\cos(2\alpha_2-\beta_2+\beta_3)]\sin\gamma_{13}-l_0F_{13}\sin\gamma_{13}\}$ $\overline{T}_{L3} = T_u\{-2F_2[\sin(2\alpha_1+2\alpha_2)+\sin(2\alpha_2)]\cos\gamma_2+2F_2[\cos(2\alpha_1+2\alpha_2)+\cos(2\alpha_2)]\sin\gamma_2+l_0F_{13}[\sin(2\alpha_1+2\alpha_2-\beta_1+\beta_3)+\sin(2\alpha_2-\beta_2+\beta_3)]\cos\gamma_{13}+2F_1\sin\gamma_1-l_0F_{13}[\cos(2\alpha_1+2\alpha_2-\beta_1+\beta_3)+\cos(2\alpha_2-\beta_2+\beta_3)]\sin\gamma_{13}-l_0F_{13}\sin\gamma_{13}\} \quad (8)$ In the above integration process, compared with the variation degree of $\varphi$ ($\dot{\varphi}=\omega_{m0}$) with time t, the changes of $2\alpha_1$ and $2\alpha_2$ are very small, and the two parameters can be regarded as slow-changing parameters thereof. According to the direct motion separation method, in the integration process, $2\alpha_1$ and $2\alpha_2$ are represented by the mean values $2\overline{\alpha}_1$ and $2\overline{\alpha}_2$ for integrals thereof.

The differences of output torques among the exciters are:

$\Delta T_{12} = \overline{T}_{L1} - \overline{T}_{L2} = T_u\{4F_2\sin(2\alpha_1)\cos\gamma_2-2l_0F_{13}\sin(2\alpha_1-\beta_1+\beta_2)\cos\gamma_{13}+l_0F_{13}[\sin(2\alpha_2-\beta_2+\beta_3)-\cos(2\alpha_1+2\alpha_2-\beta_1+\beta_3)]\sin\gamma_{13}+2F_2[\sin(2\alpha_1+2\alpha_2)-\sin(2\alpha_2)]\cos\gamma_2+2F_2[\cos(2\alpha_1+2\alpha_2)-\cos(2\alpha_2)]\sin\gamma_2\} \quad (9)$ $\Delta T_{23} = \overline{T}_{L2} - \overline{T}_{L3} = T_u\{4F_2\sin(2\alpha_2)\cos\gamma_2-2l_0F_{13}\sin(2\alpha_2-\beta_2+\beta_3)\cos\gamma_{13}+l_0F_{13}[\sin(2\alpha_1-\beta_1+\beta_2)-\sin(2\alpha_1+2\alpha_2-\beta_1+\beta_3)]\cos\gamma_{13}-l_0F_{13}[\cos(2\alpha_1-\beta_1+\beta_2)-\cos(2\alpha_1+2\alpha_2-\beta_1+\beta_3)]\sin\gamma_{13}+2F_2[\sin(2\alpha_1+2\alpha_2)-\sin(2\alpha_1)]\cos\gamma_2-2F_2[\cos(2\alpha_1+2\alpha_2)-\cos(2\alpha_1)]\sin\gamma_2\} \quad (10)$ Arranging the above two equations to obtain:

$$\frac{\Delta T_{012}}{T_u} = \tau_{c12}(\overline{\alpha}_1, \overline{\alpha}_2), \quad \frac{\Delta T_{023}}{T_u} = \tau_{c23}(\overline{\alpha}_1, \overline{\alpha}_2) \quad (11)$$

wherein, $\tau_{c12} = 4F_2\sin(2\alpha_1)\cos\gamma_2-2l_0F_{13}\sin(2\alpha_1-\beta_1+\beta_2)\cos\gamma_{13}+l_0F_{13}[\sin(2\alpha_2-\beta_2+\beta_3)-\sin(2\alpha_1+2\alpha_2-\oplus_1+\beta_3)]\cos\gamma_{13}+l_0F_{13}[\cos(2\alpha_2-\beta_2+\beta_3)-\cos(2\alpha_1+2\alpha_2-\beta_1+\beta_3)]\sin\gamma_{13}+2F_2[\sin(2\alpha_1+2\alpha_2)-\sin(2\alpha_2)]\cos\gamma_2+2F_2[\cos(2\alpha_1+2\alpha_2)-\cos(2\alpha_2)]\sin\gamma_2 \quad (12)$ $\tau_{c23} = 4F_2\sin(2\alpha_2)\cos\gamma_2-2l_0F_{13}\sin(2\alpha_2-\beta_2+\beta_3)\cos\gamma_{13}+l_0F_{13}[\sin(2\alpha_1-\beta_1+\beta_2)-\sin(2\alpha_1+2\alpha_2-\beta_1+\beta_3)]\cos\gamma_{13}-l_0F_{13}[\cos(2\alpha_1-\beta_1+\beta_2)-\cos(2\alpha_1+2\alpha_2-\beta_1+\beta_3)]\sin\gamma_{13}+2F_2[\sin(2\alpha_1+2\alpha_2)-\sin(2\alpha_1)]\cos\gamma_2-2F_2[\cos(2\alpha_1+2\alpha_2)-\cos(2\alpha_1)]\sin\gamma_2 \quad (13)$ In the above derivation, $\tau_{c12}(\alpha_1, \alpha_2)$ and $\tau_{c23}(\alpha_1, \alpha_2)$ are the dimensionless coupling torques between motors 1 and 2 and between motors 2 and 3 respectively, and the constraint functions thereof are deduced as follows:

$$|\tau_{c12}(\overline{\alpha}_1, \overline{\alpha}_2)| \leq \tau_{c12\,max}$$

$$|\tau_{c23}(\overline{\alpha}_1, \overline{\alpha}_2)| \leq \tau_{c23\,max} \quad (14)$$

To sum up, and combined with the above formula, the synchronization criterion of the three exciters can be obtained:

$$\left|\frac{\Delta T_{012}}{T_u}\right| \leq \tau_{c12max} \quad (15)$$

$$\left|\frac{\Delta T_{023}}{T_u}\right| \leq \tau_{c23max}$$

It can be seen from the above formulas that to implement synchronization, the absolute value of the difference between the dimensionless residual torques of any two exciters should be less than or equal to the maximum value of the dimensionless coupling torque.

$\overline{T}_{L1}$, $\overline{T}_{L2}$ and $\overline{T}_{L3}$ are summed and divided by $3T_u$ to obtain the average dimensionless load torque of the three exciters, which is expressed as $\tau_a(\alpha_1, \alpha_2)$.

$$\tau_a = \frac{1}{3T_u}\sum_{i=1}^{3}\overline{T}_{Li} = \frac{1}{3}\{4F_2\sin\gamma_2[\cos(2\alpha_1+2\alpha_2)+\cos(2\alpha_1)+\cos2\alpha_2)] - 2l_0F_{13}\sin\gamma_{13}[\cos(2\alpha_1+2\alpha_2-\beta_1+\beta_3)+\cos(2\alpha_1-\beta_1+\beta_2)+\cos(2\alpha_2-\beta_2+\beta_3)]+6F_1\sin\gamma_1-3l_0F_{13}\sin\gamma_{13}\} \quad (16)$$

The constraint function of the average dimensionless load torque of the three exciters is obtained as follows:

$$|\tau_a(\alpha_1, \alpha_2)| \leq \tau_{a\,max} \quad (17)$$

The synchronization capability coefficient is defined as $\zeta_{ij}$ (i, j=1, 2, 3, 4), defined as:

$$\zeta_{12} = \frac{\tau_{c12max}}{\tau_{a\,max}}, \quad \zeta_{23} = \frac{\tau_{c23max}}{\tau_{a\,max}} \quad (18)$$

The greater the synchronization capability coefficient is, the stronger the system to achieve synchronous operation.

Step 3: Stability Criterion of Synchronization Status

The kinetic energy T and potential energy V of the whole system are deduced as:

$$T = \frac{1}{2}[M_1(\dot{x}_1^2 + \dot{y}_1^2) + M_2(\dot{x}_2^2 + \dot{y}_2^2) + \\ M_3(\dot{x}_3^2 + \dot{y}_3^2) + M_4(\dot{x}_4^2 + \dot{y}_4^2) + 3m_0 r^2 \omega_0^2 + J\dot{\psi}^2] \quad (19)$$

$$V = \frac{1}{2}\{k_1[(x_1 - x_4)^2 + (y_1 - y_4)^2] + k_2[(x_2 - x_4)^2 + (y_2 - y_4)^2] + \\ k_3[(x_3 - x_4)^2 + (y_3 - y_4)^2] + k_4[(x_4)^2 + (y_4)^2]\} \quad (20)$$

Average kinetic energy $E_T$ and average potential energy $E_V$ can be obtained in a single cycle.

Hamilton's average action amplitude over one periodic, denoted by I, is presented by:

$$I = \frac{1}{2\pi}\int_0^{2\pi}(T - V)d\varphi = E_T - E_v \quad (21)$$

Expressing the Hesse matrix of I as H to obtain:

$$H = \begin{bmatrix} d_{11} & d_{12} \\ d_{21} & d_{22} \end{bmatrix} \text{ wherein} \quad (22)$$

$$d_{11} = \frac{\partial^2 I}{\partial \overline{\alpha}_1^2} = -2r^2\{[4k_0F_1F_4\cos(\gamma_1 - \gamma_4) + 8k_0F_2F_4\cos(\gamma_2 - \gamma_4) + \\ 4\omega_{m0}^2 M_0 F_1 F_2\cos(\gamma_1 - \gamma_2) - 4k_0F_1F_2\cos(\gamma_1 - \gamma_2) + 2\omega_{m0}^2 M_0 F_2^2 + \\ 2\omega_{m0}^2 M_4 F_4^2 - 2k_0F_2^2 - 6k_0F_4^2] \times [\cos(2\alpha_1) + \cos(2\alpha_1 + 2\alpha_2)] + \\ \omega_{m0}^2 JF_{13}^2\cos(2\alpha_1 - \beta_1 + \beta_2) + \cos(2\alpha_1 + 2\alpha_2 - \beta_1 + \beta_3)]\}$$

$$d_{12} = d_{21} = \frac{\partial^2 I}{\partial \overline{\alpha}_1 \partial \overline{\alpha}_2} = -2r^2\{[4\omega_{m0}^2 M_0 F_1 F_2\cos(\gamma_1 - \gamma_2) + \\ 4k_0F_1F_4\cos(\gamma_1 - \gamma_4) + 8k_0F_2F_4\cos(\gamma_2 - \gamma_4) - 4k_0F_1F_2 \\ \cos(\gamma_1 - \gamma_2) + 2\omega_{m0}^2 M_4 F_4^2 + 2\omega_{m0}^2 M_0 F_2^2 - 2k_0F_2^2 - 6k_0F_4^2] \\ \cos(2\alpha_1 + 2\alpha_2) + \omega_{m0}^2 JF_{13}^2\cos(2\alpha_1 + 2\alpha_2 - \beta_1 + \beta_3)\}$$

$$d_{22} = \frac{\partial^2 I}{\partial \overline{\alpha}_2^2} = -2r^2\{[8k_0F_2F_4\cos(\gamma_2 - \gamma_4) + \\ 4\omega_{m0}^2 M_0 F_1 F_2\cos(\gamma_1 - \gamma_2) + 4k_0F_1F_4\cos(\gamma_1 - \gamma_4) - \\ 4k_0F_1F_2\cos(\gamma_1 - \gamma_2) + 2\omega_{m0}^2 M_0 F_2^2 + 2\omega_{m0}^2 M_4 F_4^2 - \\ 2k_0F_2^2 - 6k_0F_4^2] \times [\cos(2\alpha_2) + \cos(2\alpha_1 + 2\alpha_2)] + \\ \omega_{m0}^2 JF_{13}^2[\cos(2\alpha_2 - \beta_2 + \beta_3) + \cos(2\alpha_1 + 2\alpha_2 - \beta_1 + \beta_3)]\}$$

Letting $$H_1 = d_{11}$$

$$H_2 = d_{11}d_{22} - d_{12}d_{21}$$

In order to make the Hesse matrix of I positive definite, i.e., the H matrix positive definite, the following shall be satisfied:

$$H_1 > 0, H_2 > 0 \quad (23)$$

Defining $H_1$ and $H_2$ as the stability capability coefficients of the system in the synchrous condition, the above formulas can be used to describe the stability of the system, and when the above formulas in (23) are satisfied, the system is stable.

The present invention has the following beneficial effects: the parameters of the high-frequency vibrating mill obtained by the method can lower the technical requirements of exciters, reduce the loss of the exciters, increase the service life of the mill, and ensure that the mill has a better crushing effect, small noise, no pollution and high reliability at the same time, which have a significant directive function for the design of structural parameters of vibrating feeder devices and the selection of working areas.

DESCRIPTION OF DRAWINGS

Meanings of parameters in dynamic model of system in FIG. 1.

$m_1$—mass of mass body 1;
$m_2$—mass of mass body 2;
$m_3$—mass of mass body 3;
$m_4$—mass of mass body 4;
$m_{01}$—mass of exciter rotor 1;
$m_{02}$—mass of exciter rotor 2;
$m_{03}$—mass of exciter rotor 3;
$\varphi_1$—rotation angle of exciter rotor 1;
$\varphi_2$—rotation angle of exciter rotor 2;
$\varphi_3$—rotation angle of exciter rotor 3;
$k_i$, i=0~4—spring stiffness coefficient;
$\beta_i$(i=1~3)—included angle between the line from the rotary center of exciter i to the mass center of a vibrating rigid body and the horizontal direction;
$l_0$—distance from the mass center of each exciter to the mass center of the vibrating rigid body;
$l_{x3}$—horizontal distance from the spring of mass body 4 to the mass center of a vibrating trough;
$l_{y3}$—vertical distance from the spring of mass body 4 to the mass center of the vibrating trough;
$l_{x1}$—horizontal distance from the near endpoint of the spring to the mass center of each of the three mass bodies;
$l_{x2}$—horizontal distance from the far endpoint of the spring to the mass center of each of the three mass bodies;
$l_{y1}$—vertical distance from the near endpoint of the spring to the mass center of each of the three mass bodies;
$l_{y2}$—vertical distance from the far endpoint of the spring to the mass center of each of the three mass bodies.

DETAILED DESCRIPTION

Figure 1:
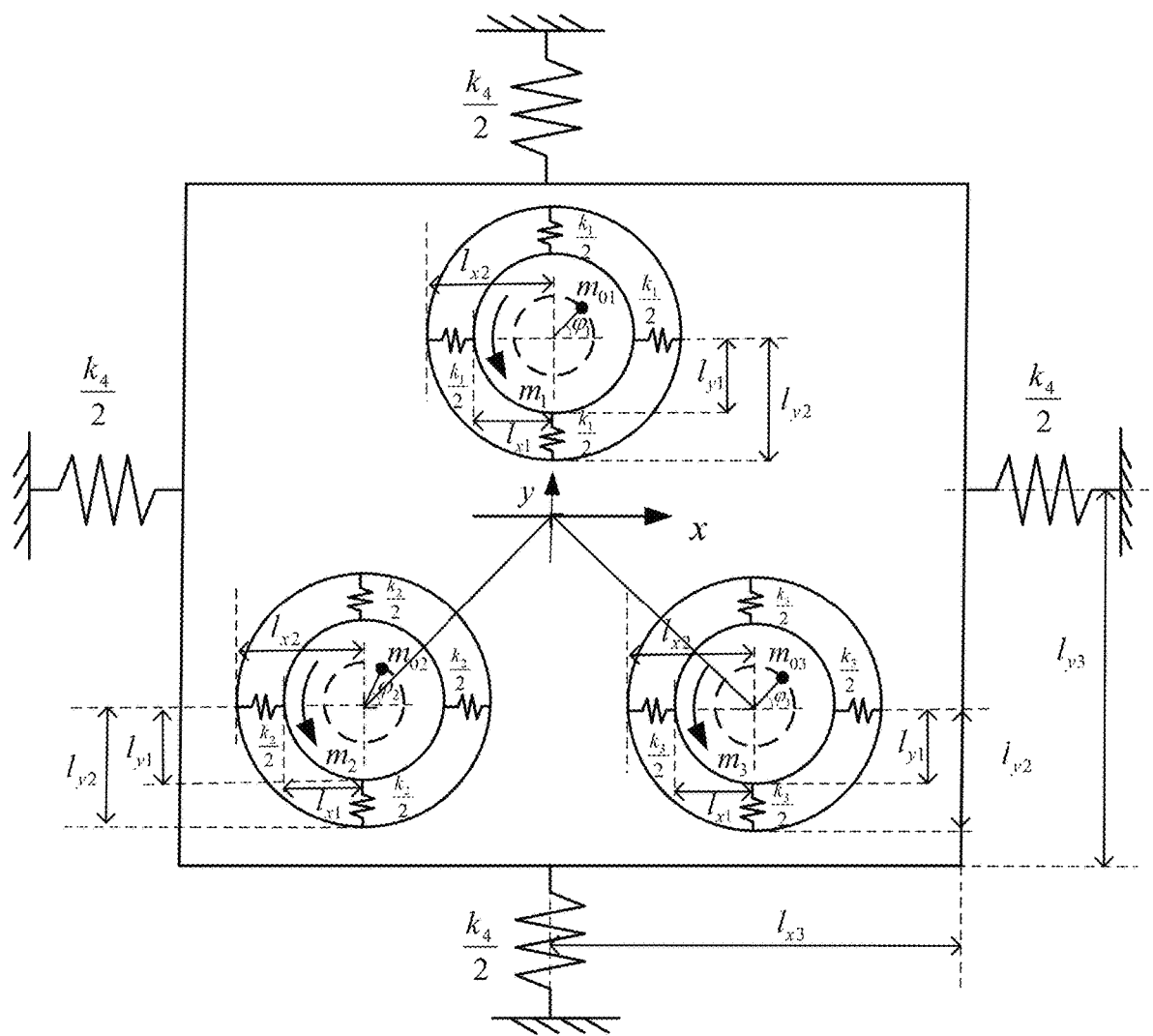

A high-frequency vibrating mill with three grinding drums, wherein a dynamic model thereof is shown in FIG. 1, comprising: exciters $m_{0i}$(i=1~3); mass bodies $m_i$(i=1~4), and springs $k_i$(i=1~4). The model is composed of three exciters and four mass bodies. The three exciters rotate in the same direction, and each exciter rotates about its rotation axis, represented by $\varphi_{oi}$.

Embodiment 1: Numerical Verification

Giving the parameters first, the masses of mass bodies 1, 2, and 3 are equal, $m_1=m_2=m_3=1400$ kg, and the mass of mass body 4 is 2000 kg, the masses of exciters 1, 2, and 3 are equal and set as $m_0=10$ kg. Assuming $l_0=1.1$ m and the spring stiffness are: $k_1=k_2=k_3=46000$ kN/m, $k_4=10$ kN/m, $k_\psi=4000$ kN/rad. Based on the given parameters setting, it can be obtained that $\omega_\psi=52$ rad/s, $\omega_0=179$ rad/s and $\omega 3=319$ rad/s.

Therefore, according to $\omega_0=179$ rad/s and $\omega_3=319$ rad/s, three areas can be divided: area 1 is $\omega_{m0}<\omega_0$, area 2 is $\omega_0<\omega_{m0}<\omega_3$, and area 3 is $\omega_3<\omega_{m0}$.

Figure 2:
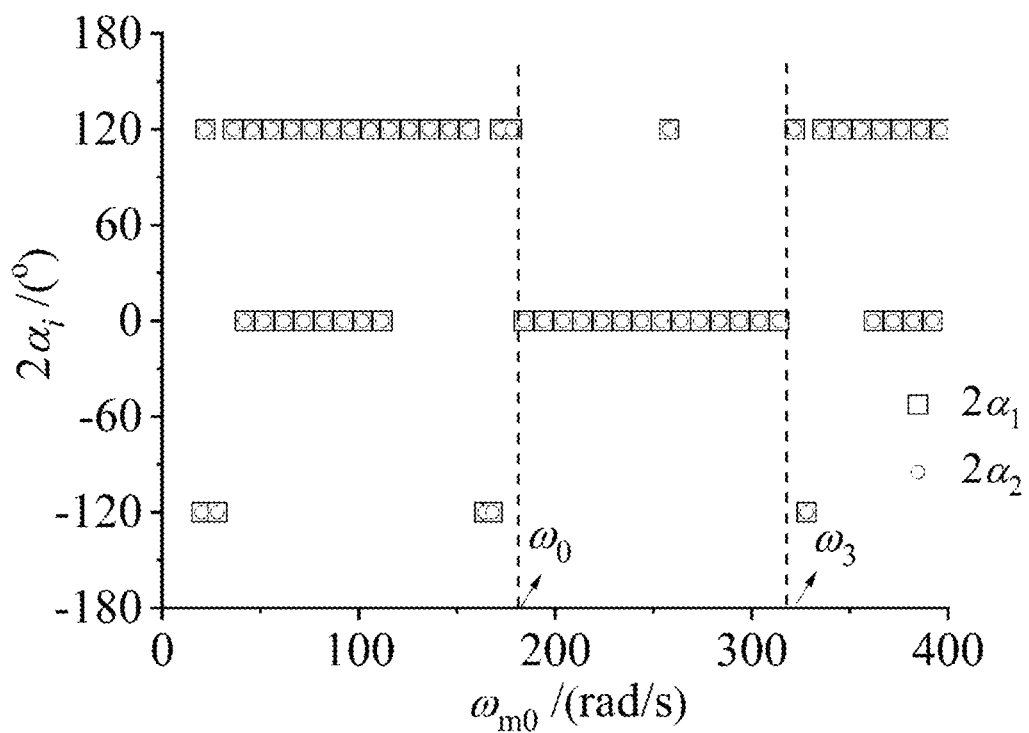
FIG. 2: phase difference among three exciters.

FIG. 2 shows the stable phase difference between two exciters. In the sub-resonant area relative to $\omega_0$, the phase difference has two sets of solutions, one of which is 0° and 120°, the other is 120°; in the sub-resonant area relative to $\omega_3$, 0° and 120°; and in the super-resonant area relative to $\omega_3$, 0° and 120°, and 120°.

Figure 3:
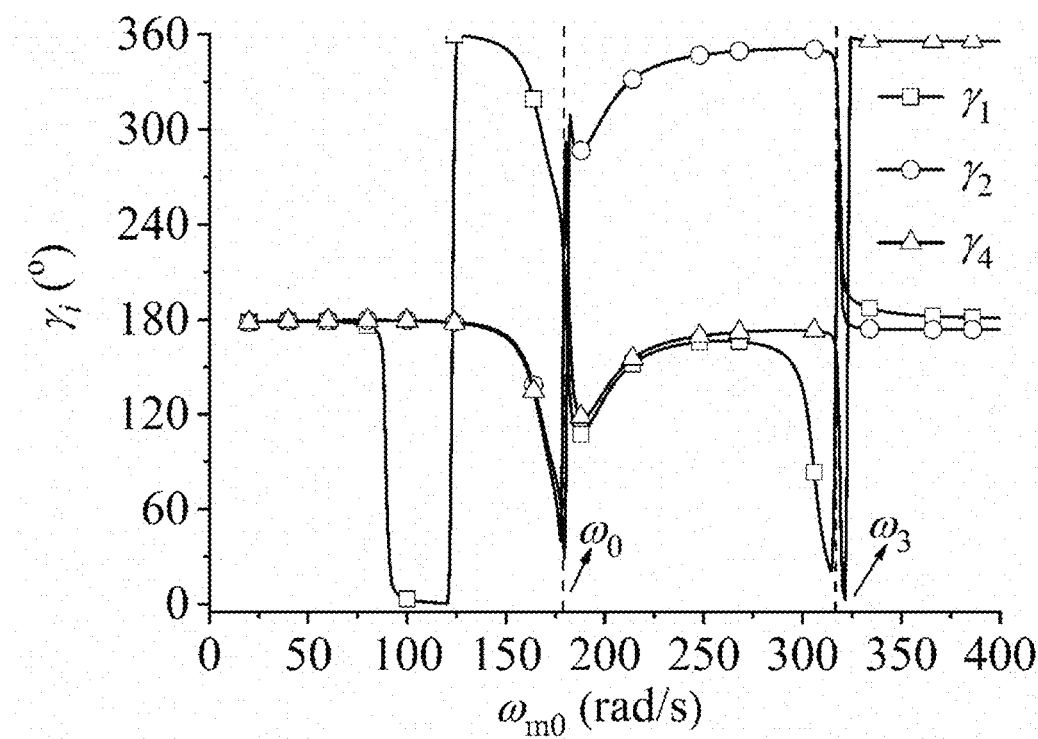
FIG. 3: phase lag angle

FIG. 3 shows the lag angle of the three mass bodies, and γ is the lag angle. In the first area, $\gamma_1$ is 0, $\gamma_2$ and $\gamma_4$ are 180; in the second area, $\gamma_2$ is 360, $\gamma_1$ and $\gamma_4$ are 180; and in the third area, $\gamma_4$ is 360, $\gamma_1$ and $\gamma_2$ are 180.

Figure 4:
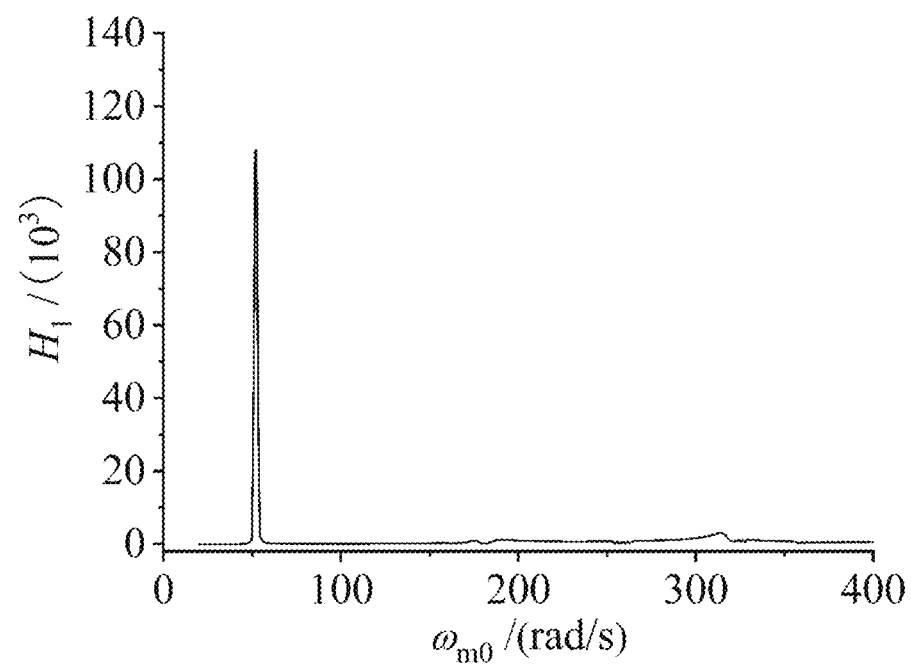
FIG. 4: stability capacity coefficient $H_1$.
Figure 5:
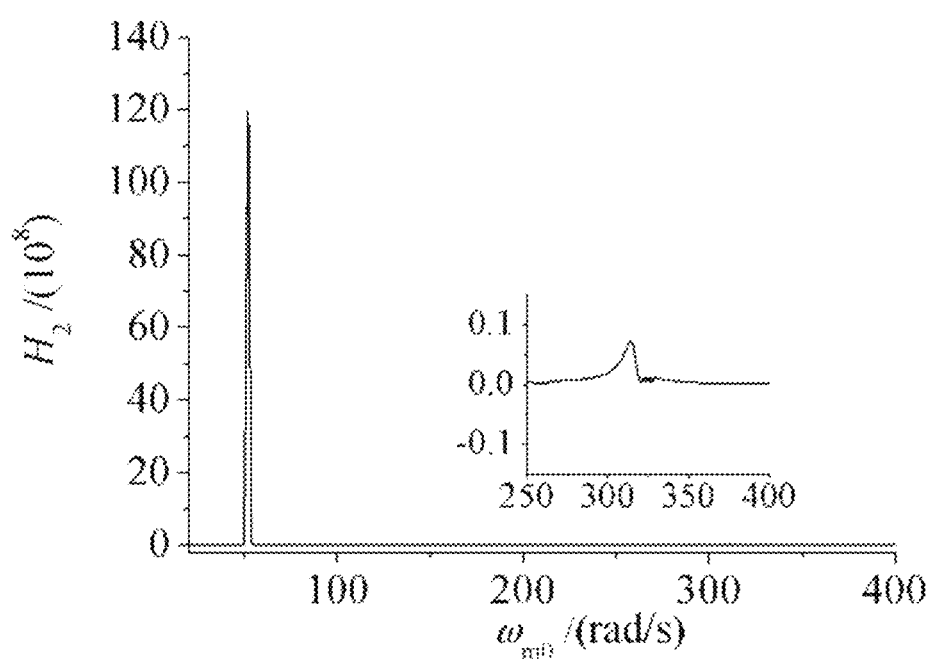
FIG. 5: stability capacity coefficient $H_2$.

FIG. 4 and FIG. 5 show the stability capacity coefficient curve, and it can be seen from an enlarged view of the curve that the stability capacity coefficient curve is greater than or equal to 0 in the whole interval. Moreover, in area 1, the stability coefficient is increased significantly.

Figure 6:
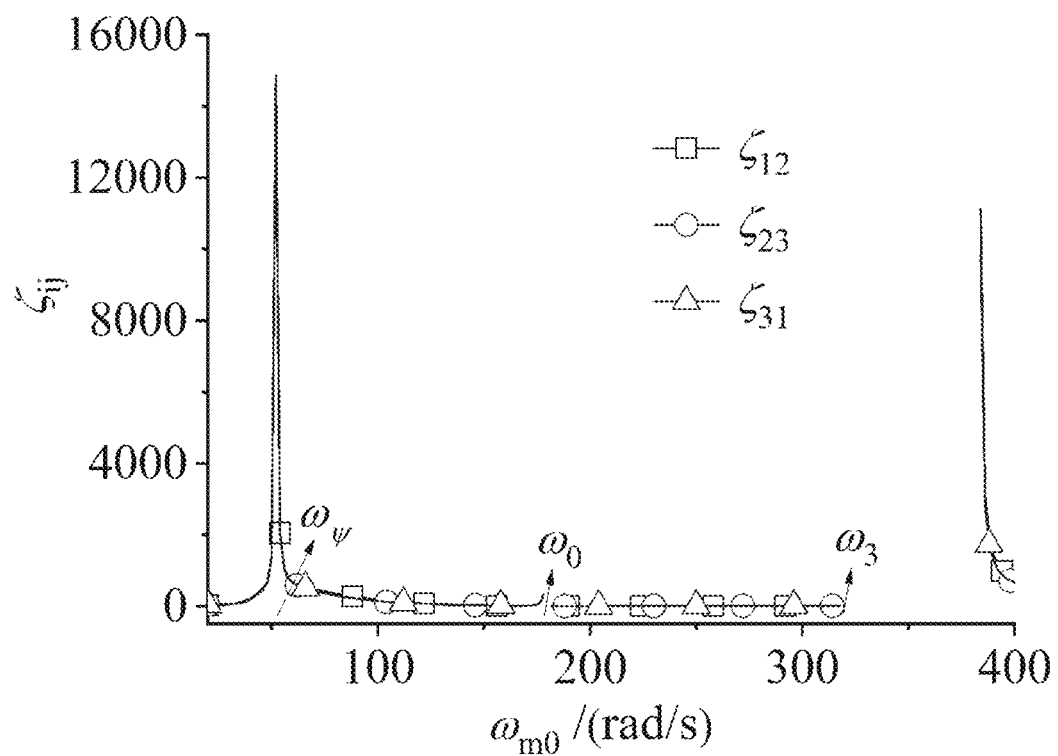
FIG. 6: synchronization capacity coefficient curve.

FIG. 6 shows the synchronization capability coefficient. It can be seen that the extremum is around at $\omega_\psi$, and the synchronization capability coefficient is nearly 0 at points of $\omega_0$ and $\omega_3$.

Figure 7:
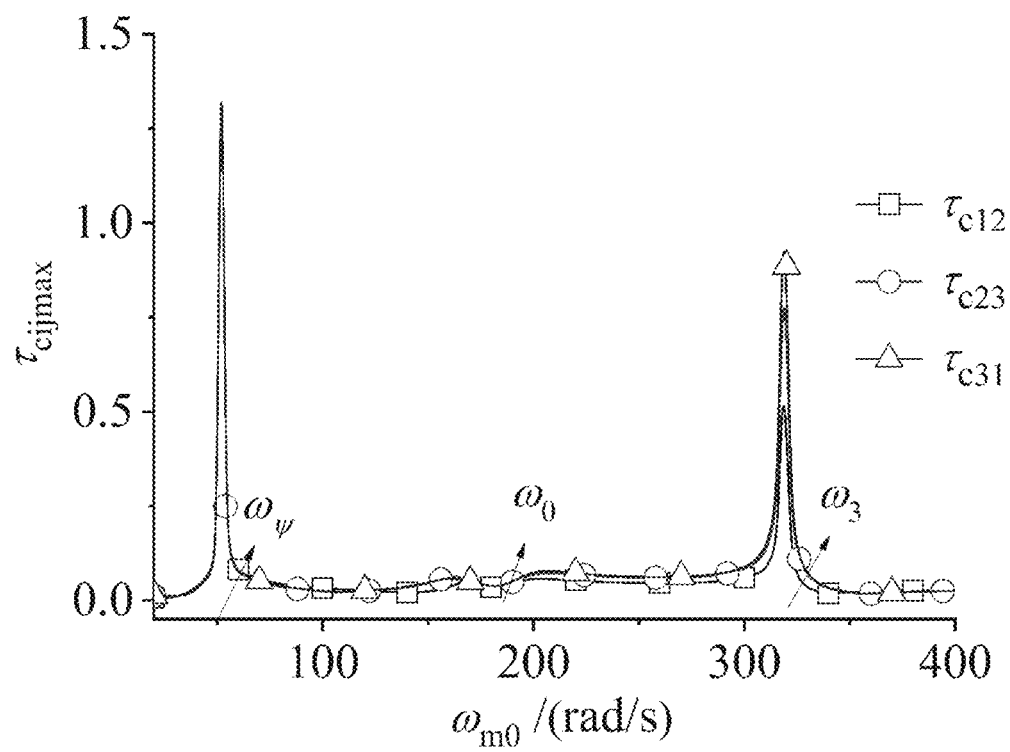
FIG. 7: maximum coupling torque curve.

FIG. 7 shows the maximum coupling torque curve. It can be seen that the extremum of the maximum coupling torque is observed in the vicinity of point $\omega_\psi$, and the maximum coupling torque increases significantly when approaches $\omega_3$.

The results of numerical analysis show that when the system is operated in the sub-resonant state relative to $\omega_0$ and super-resonant state of $\omega_3$, i.e., area 1 ($\omega_{m0}<\omega_0$) and area 3 ($\omega_3<\omega_{m0}$), the phase difference between two exciters has two sets of stable solutions, and nonlinear system diversity appears; and when the system is in sub-resonant corresponding to $\omega_3$, or super-resonant state relative to $\omega_0$, i.e., area 2 ($\omega_0<\omega_{m0}<\omega_3$), the working region is divided into a first half and a second half with $\omega_{m0}=250$ rad/s as the midpoint. In the first half, the system only has one set of stable solutions about phase difference, while in the second half, the system has two sets of stable solutions, which then become one set of stable solutions.

Embodiment 2: Simulation of the Vibrating System

During the simulation of a vibrating system, a fourth order fourth-order Rouge-Kutta procedure is mainly used, where four sets of simulation is finished corresponding to the three areas previously divided. In actual engineering applications, the same exciters are generally used, and the parameters of four motors are selected to be same, i.e., η=1.0. The overall system parameters are set as follows: rotor resistance $R_r=3.40\Omega$, stator resistance $R_s=3.35\Omega$, rotor inductance $L_r=170$ mH, stator inductance $L_s=170$ mH, mutual inductance $L_m=164$ mH, and $f_{1y}=f_{2y}=0.05$. Other parameters of the vibrating system: r=0.15 m, $m_1=m_2=m_3=1400$ kg, $m_0=10$ kg, and $k_1=k_2=k_3=k_0$. The parameters are adjusted to make the system operate in the sub-resonant and super-resonant states, respectively.

For the simulation of area 1, assuming $k_0=30000$ KN/m, $k_4=30$ KN/m, and $k_\psi=4000$ KN/m:

The rotational speed of the motors corresponding to the simulation result is 894 r/min. Through calculation, the rotational speed is 114 rad/s in the phase difference diagram of numerical analysis in this condition.

Figure 8:
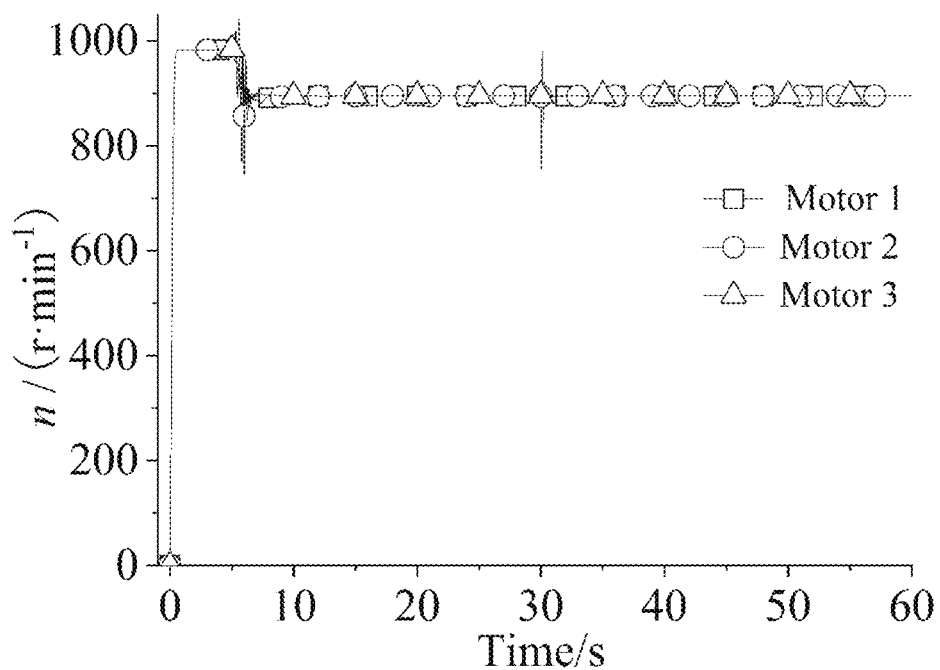
FIG. 8: rotational speeds of three motors in area 1.

FIG. 8 shows the stable state of the speed of two exciters. The speed of the two exciters becomes stable quickly in a short time, and the synchronization speed is basically stabilized at about 894 r/min. After interference is added on exciter 2 at 30 s, the rotational speed is not changed significantly.

Figure 9:
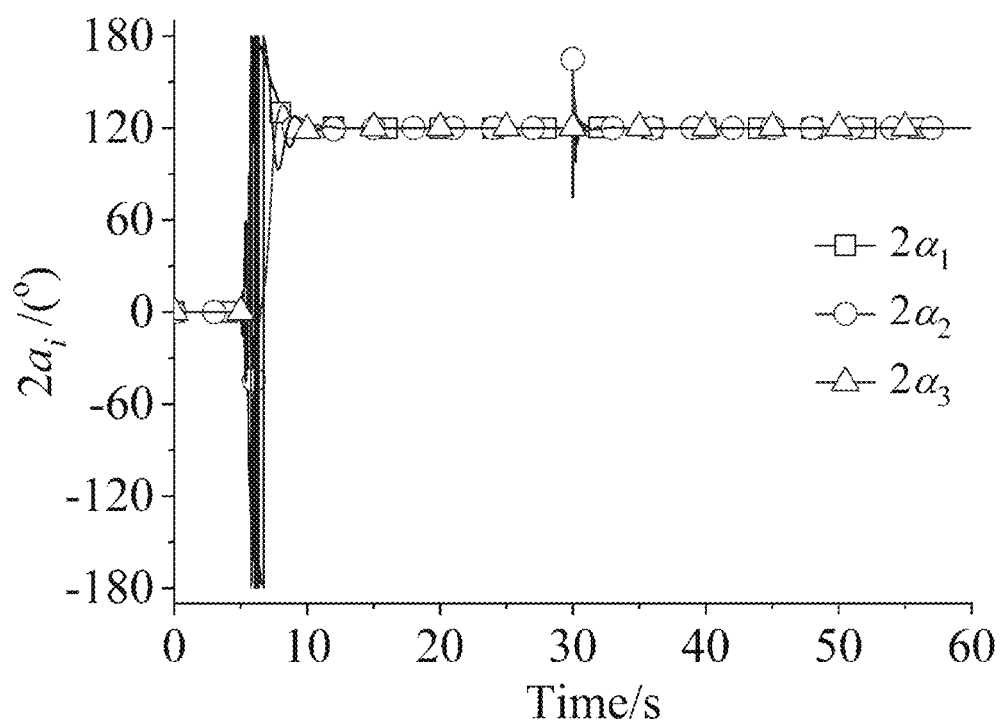
FIG. 9: phase difference among three exciters in area 1.

FIG. 9 shows the stable state of the phase difference. In the stable state, the phase difference between exciters 1 and 2, 2 and 3, 1 and 3 is both in the vicinity of 120°; after interference is added at 30 s, the curve has a small fluctuation and then returns to the original phase difference quickly.

Figure 10:
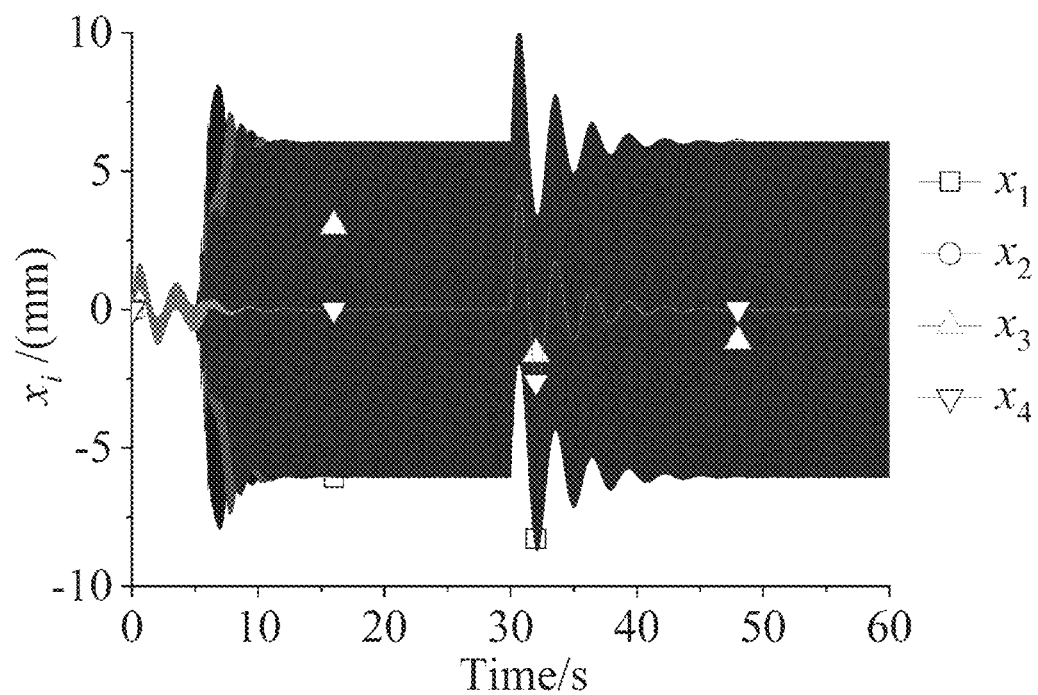
FIG. 10: displacement of area 1 in x direction.
Figure 11:
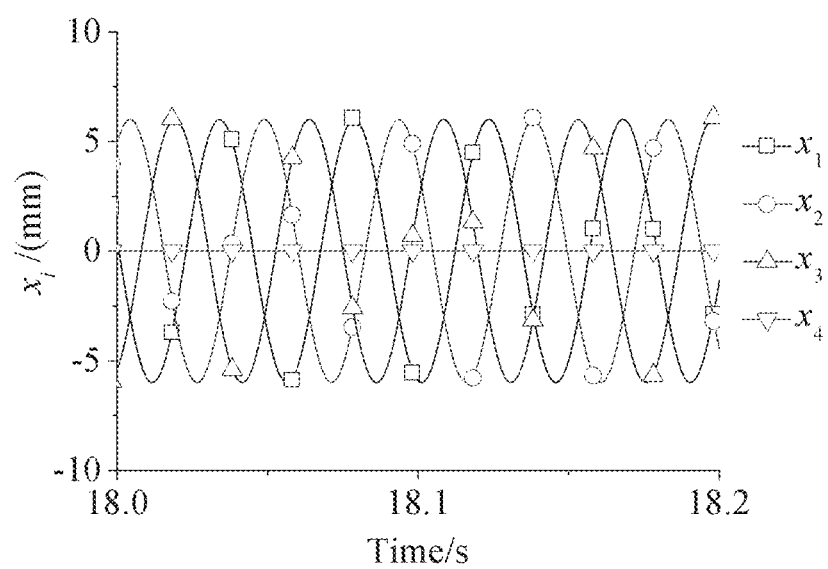
FIG. 11: partial enlarged view of the front part of displacement of area 1 in x direction.
Figure 12:
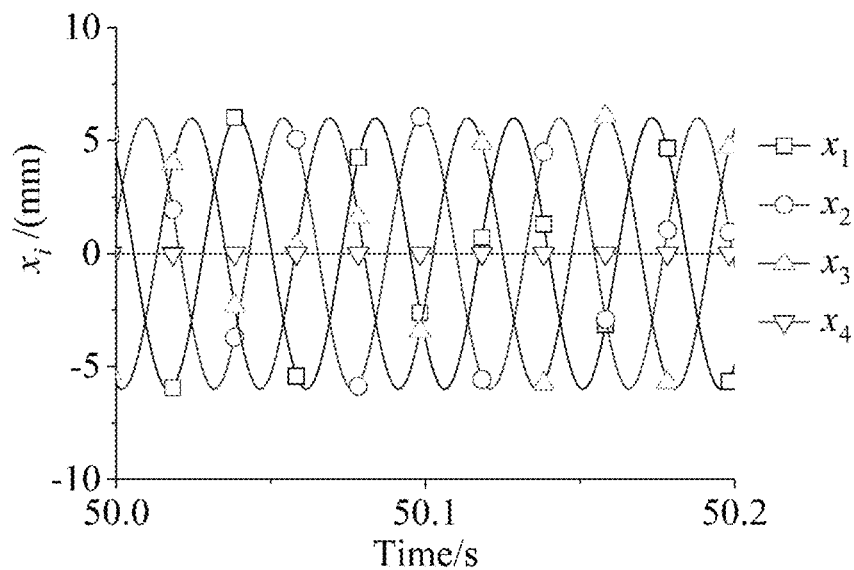
FIG. 12: partial enlarged view of the rear part of area 1 in x direction.

FIGS. 10, 11, and 12 show the displacements of mass bodies 1, 2, and 3 in x direction. It can be seen from the partial enlarged view of the displacement relationship that the displacements among mass bodies 1, 2, and 3 are equal, whereas there exists no vibration for mass body 4 in x direction; after interference is added at 30 s, the displacement curve is not changed significantly.

Figure 13:
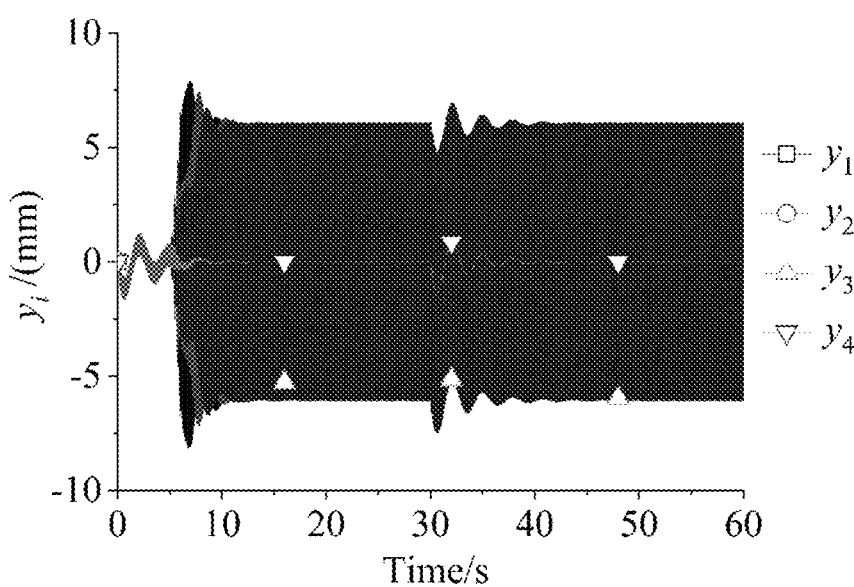
FIG. 13: displacement of area 1 in y direction.
Figure 14:
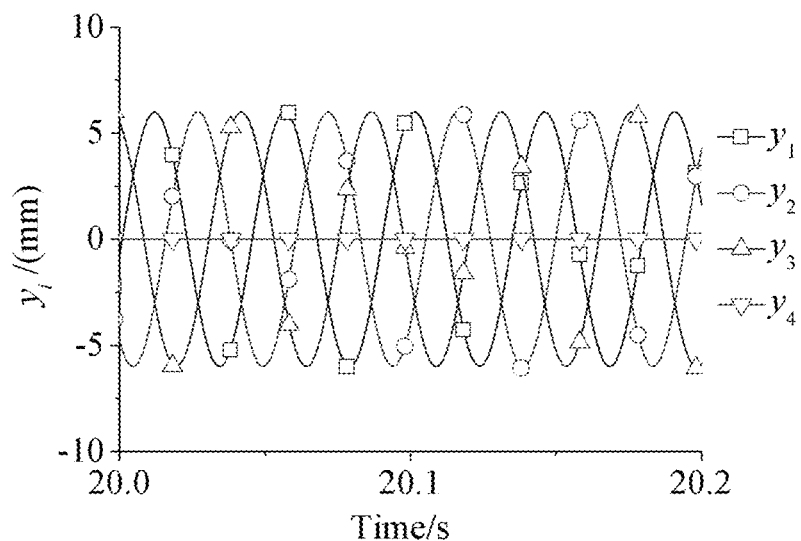
FIG. 14: partial enlarged view of the front part of displacement of area 1 in y direction.
Figure 15:
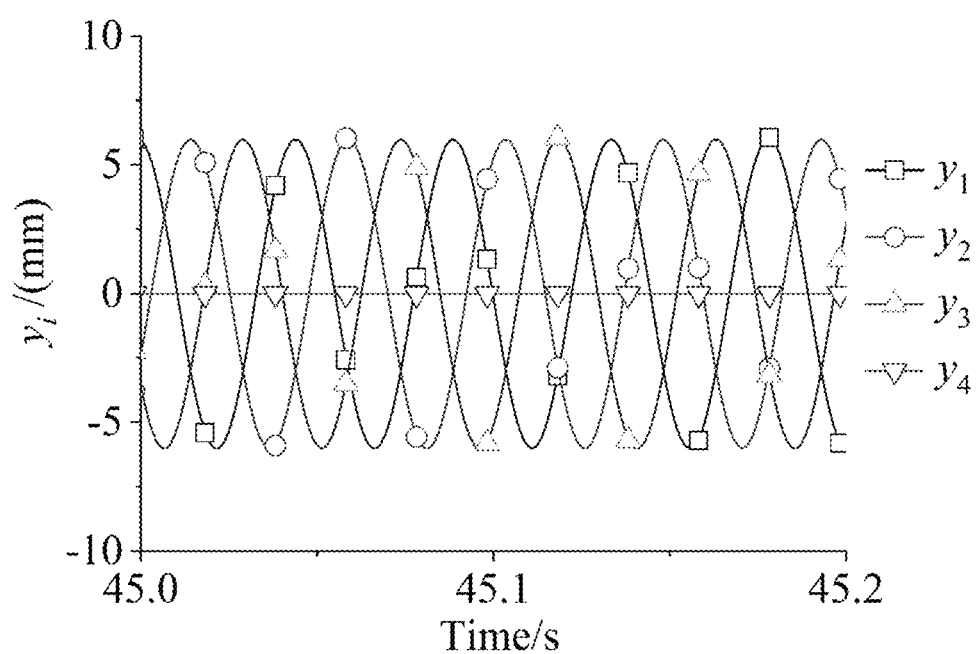
FIG. 15: partial enlarged view of the rear part of displacement of area 1 in y direction.

Similarly, FIGS. 13, 14, and 15 show the displacements of mass bodies 1, 2, and 3 in y direction. From FIGS. 13-15, the displacements among mass bodies 1, 2, and 3 are equal, whereas the mass body 4 is nearly at rest in y direction. The displacement curve of each mass body is consistent before and after the addition of interference.

Figure 16:
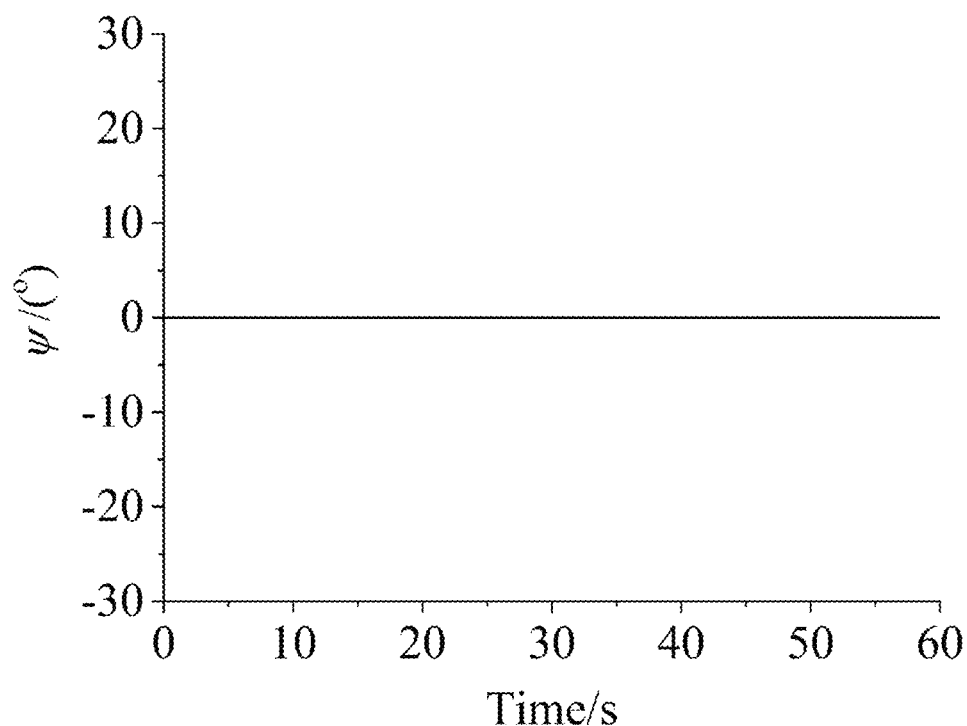
FIG. 16: oscillating displacement of area 1.

FIG. 16 shows the simulation curve of oscillating angle of the system. It can be seen that the oscillating angle is near 0° and does not change obviously when implement the interference.

For simulation of area 2(a), the stiffness parameters are set as $k_0$=9000 KN/m, $k_4$=30 KN/m, and $k_\psi$=3000 KN/m.

Figure 17:
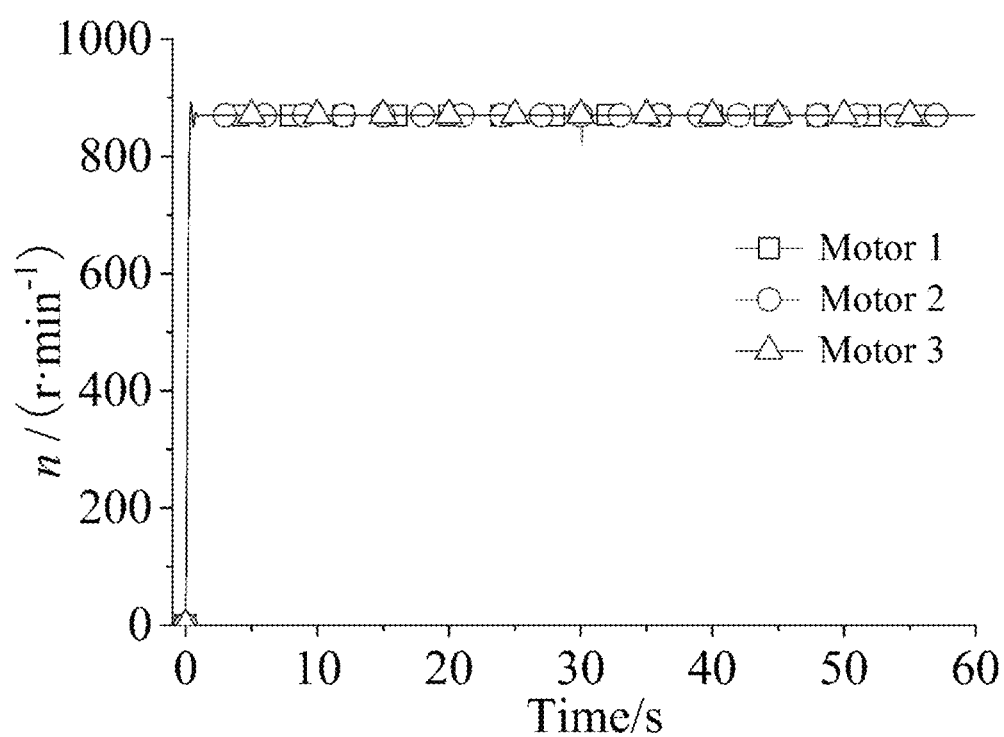
FIG. 17: rotational speeds of three motors in area 2(a)

FIG. 17 shows the stable state of the speed of two exciters. The rotational speed of the motors corresponding to the simulation result is 870 r/min. After interference is added on exciter 2 at 30 s, the rotational speed is not changed significantly. Through calculation, the rotational speed corresponds to 205 rad/s in the phase difference diagram of numerical analysis at this time.

Figure 18:
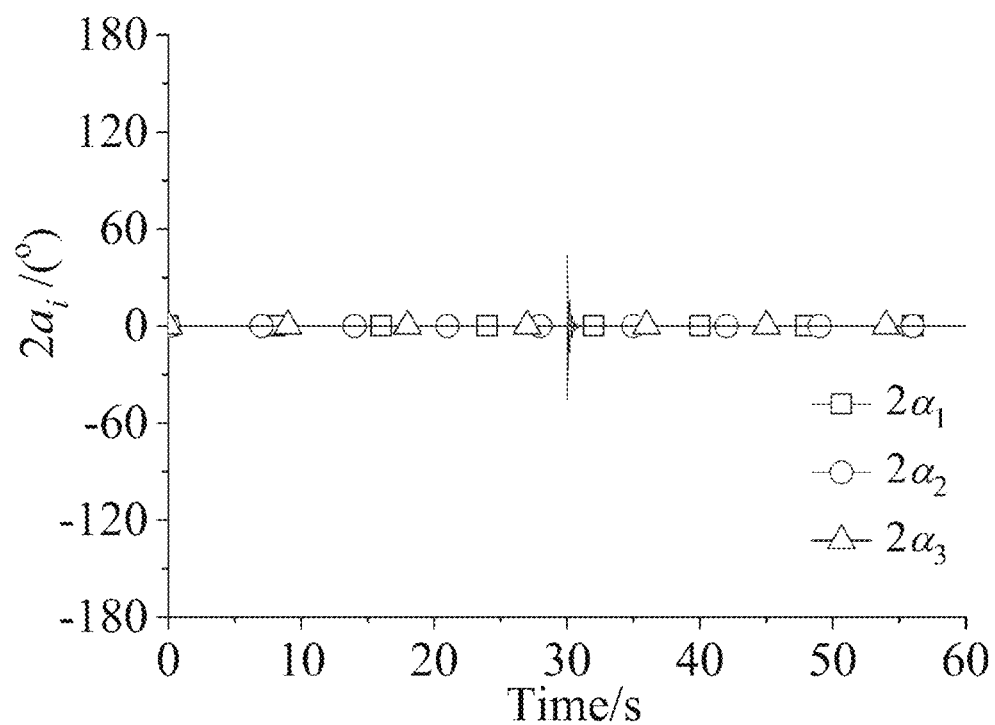
FIG. 18: phase difference among three exciters in area 2(a)

FIG. 18 shows the stable state of the phase difference. The phase difference between exciters 1 and 2, exciters 2 and 3, exciters 1 and 3 is both around 0°; after interference is added at 30 s, the phase difference remains unchanged.

Figure 19:
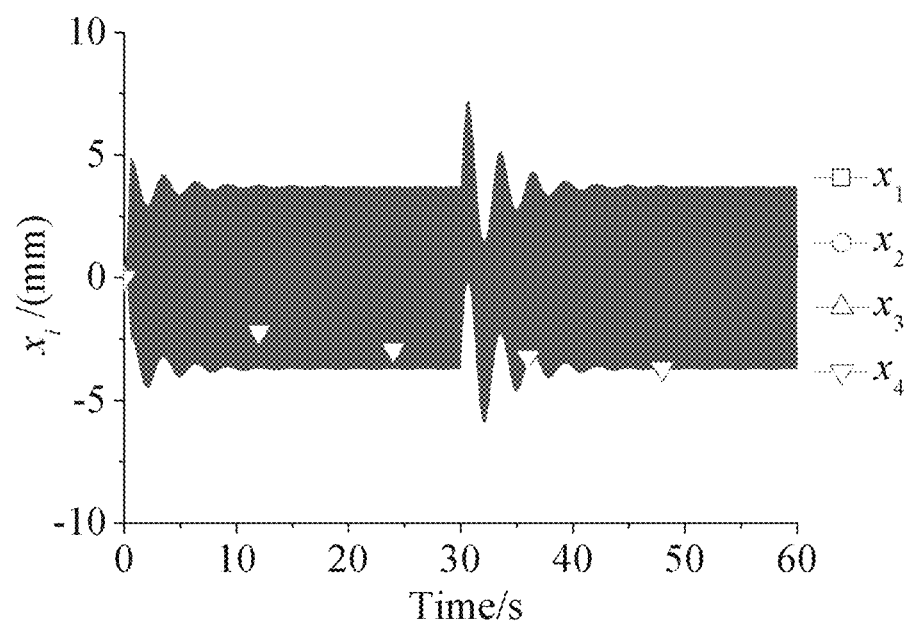
FIG. 19: displacement of area 2(a) in x direction.
Figure 20:
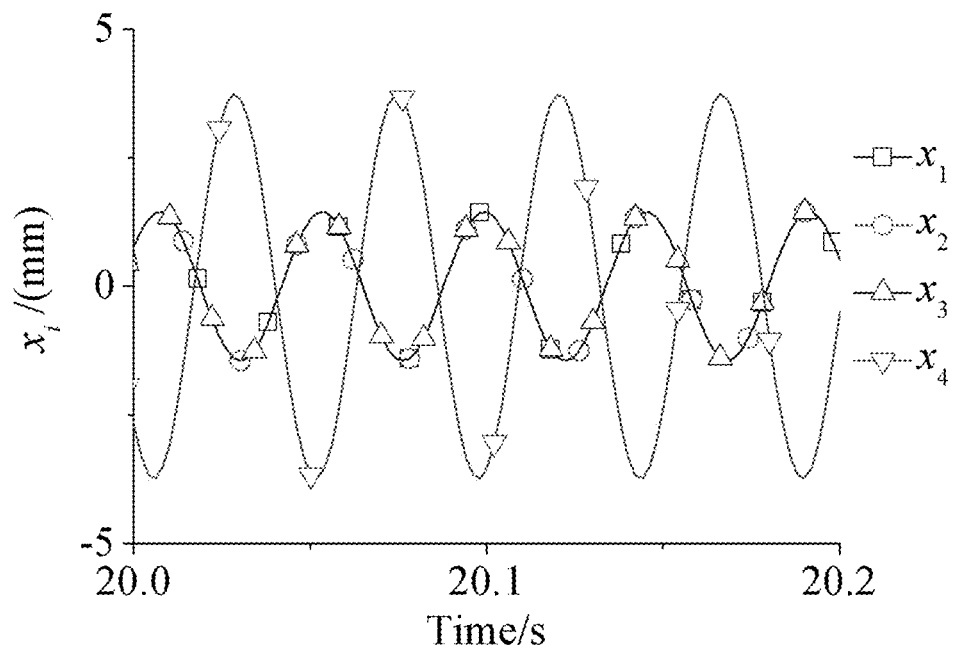
FIG. 20: partial enlarged view of the front part of displacement of area 2(a) in x direction.
Figure 21:
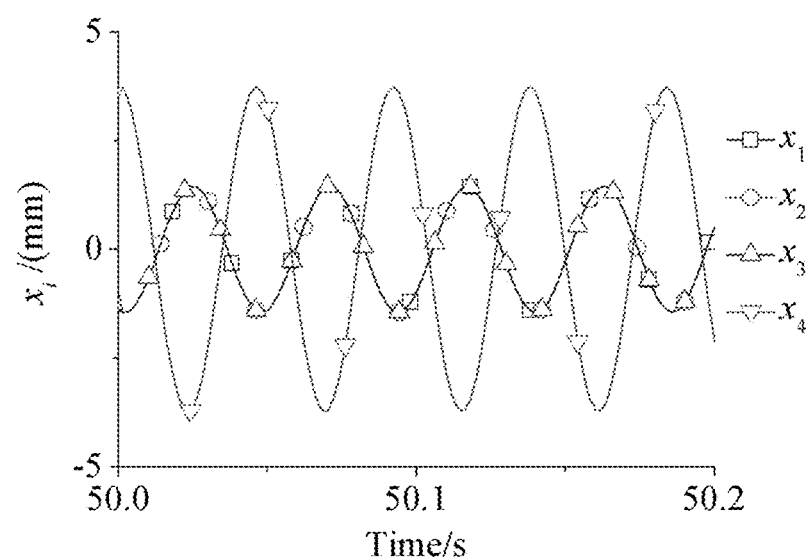
FIG. 21: partial enlarged view of the rear part of displacement of area 2(a) in x direction.

FIGS. 19-21 illustrates the displacements of mass bodies 1, 2, and 3 in x direction. According to the partial enlarged view, the displacements among mass bodies 1, 2, and 3 are equal, and the displacement direction of mass body 4 is opposite to the moving direction of mass bodies 1, 2, and 3; after interference is added at 30 s, the displacement curve remains stable.

Figure 22:
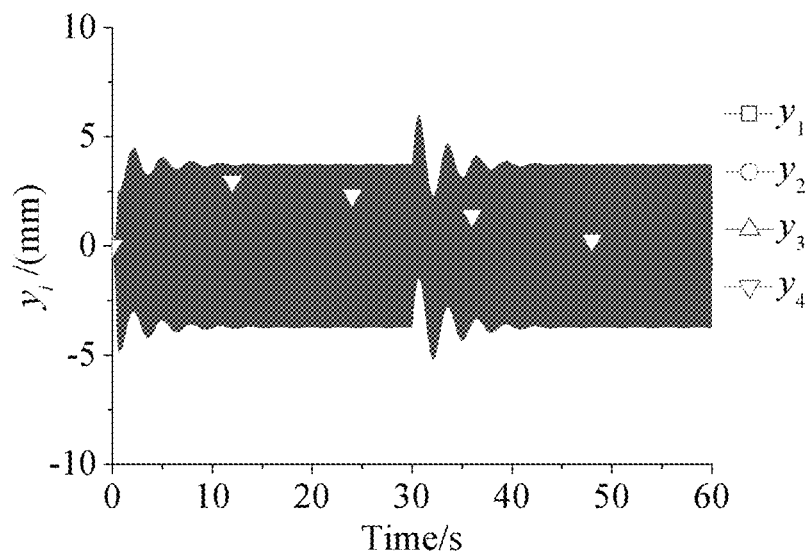
FIG. 22: displacement of area 2(a) in y direction.
Figure 23:
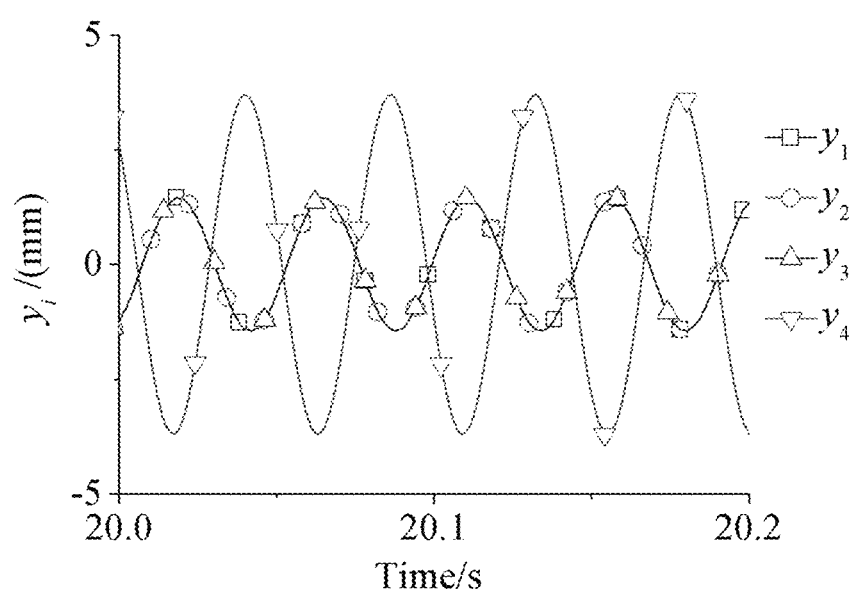
FIG. 23: partial enlarged view of the front part of displacement of area 2(a) in y direction.
Figure 24:
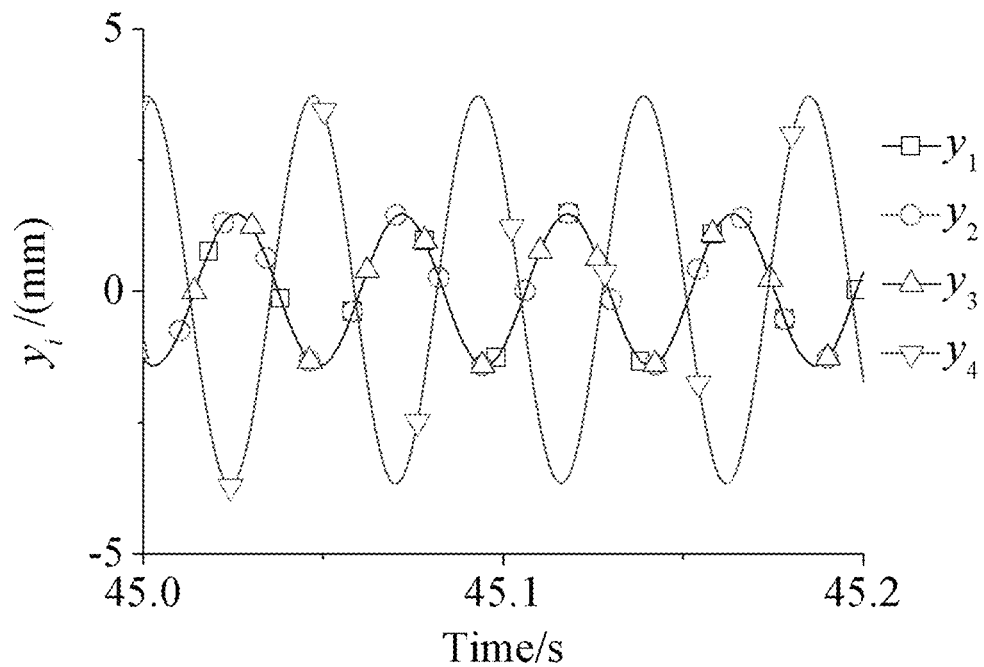
FIG. 24: partial enlarged view of the rear part of displacement of area 2(a) in y direction.
Figure 25:
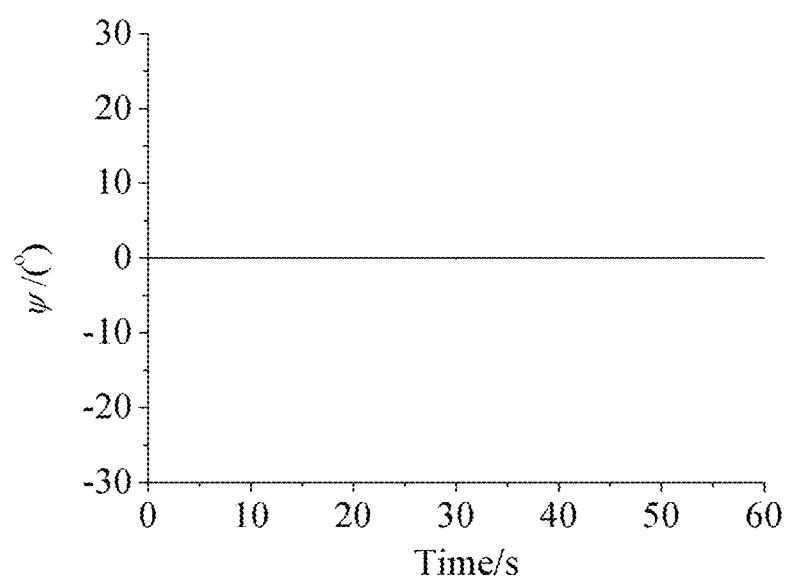
FIG. 25: oscillating displacement of area 2(a)

FIGS. 22-24 show the displacements of mass bodies 1, 2, and 3 in y direction, where the motion characteristics are similar to that of x direction. Besides, the oscillating angle is plotted as FIG. 25, which is almost 0° and nearly unchanged after adding interference to the system.

For simulation of area 2(b), the parameters are set as $k_0$=9000 KN/m, $k_4$=30 KN/m, and $k_\psi$=3000 KN/m. The rotational speed of the motors corresponding to the simulation result is 982 r/min. Through calculation, the rotational speed corresponds to 264 rad/s in the phase difference diagram of numerical analysis in this condition.

Figure 26:
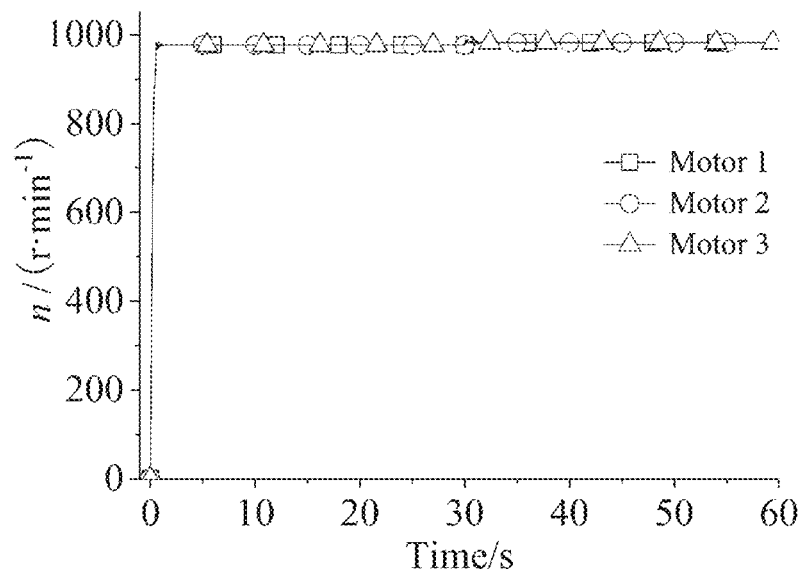
FIG. 26: rotational speeds of three motors in area 2(b)

FIG. 26 shows the stable state of the speed of two exciters. The speed of the two exciters becomes stable quickly in a short time, and the synchronization speed is basically stabilized at 982 r/min; after interference is added on exciter 2 at 30 s, the rotational speed is not changed significantly.

Figure 27:
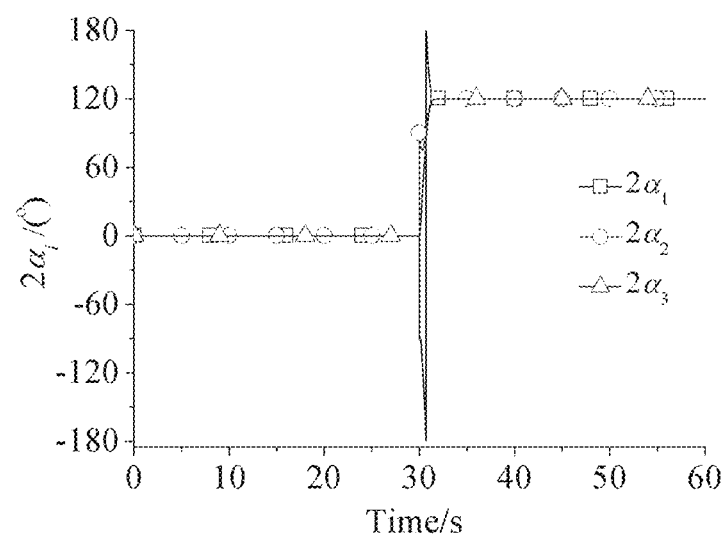
FIG. 27: phase difference among three exciters in area 2(b)

FIG. 27 shows the stable state of the phase difference. The phase difference between exciters 1 and 2, exciters 2 and 3, exciters 1 and 3 is 0°; after interference is added at 30 s, the phase difference is suddenly changed to 120°.

Figure 28:
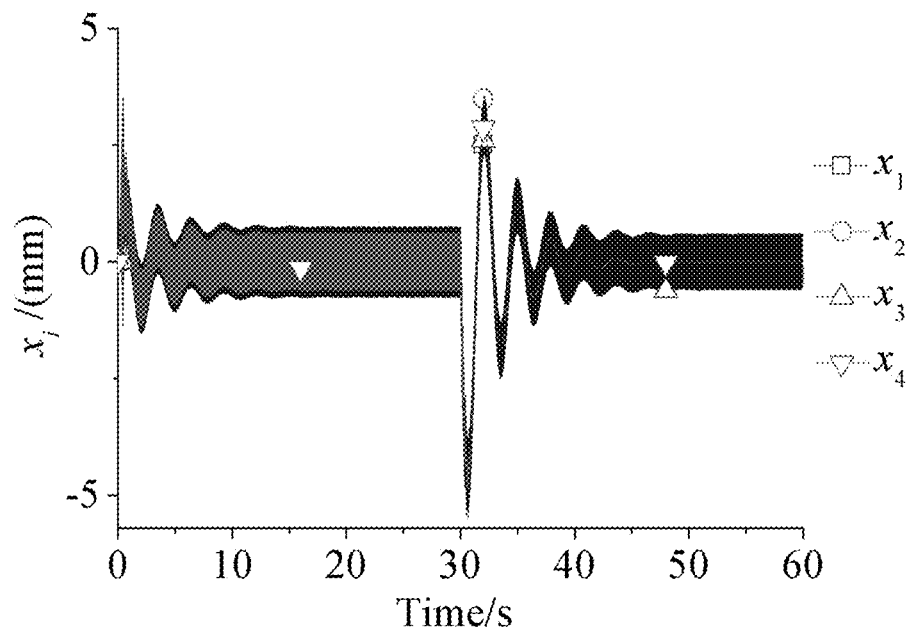
FIG. 28: displacement of area 2(b) in x direction.
Figure 29:
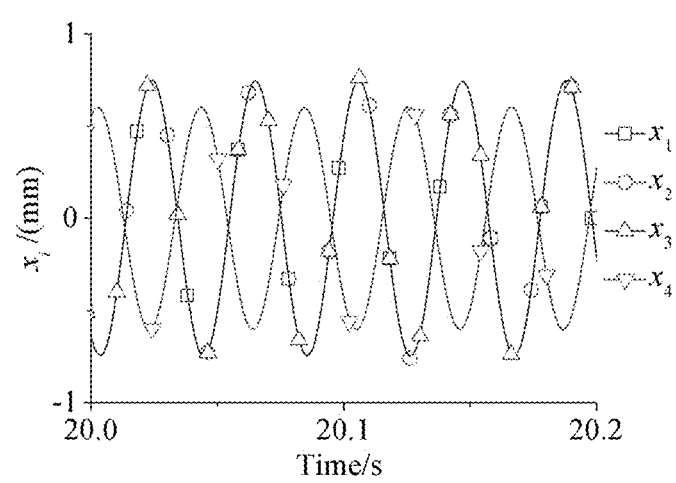
FIG. 29: partial enlarged view of the front part of displacement of area 2(b) in x direction.
Figure 30:
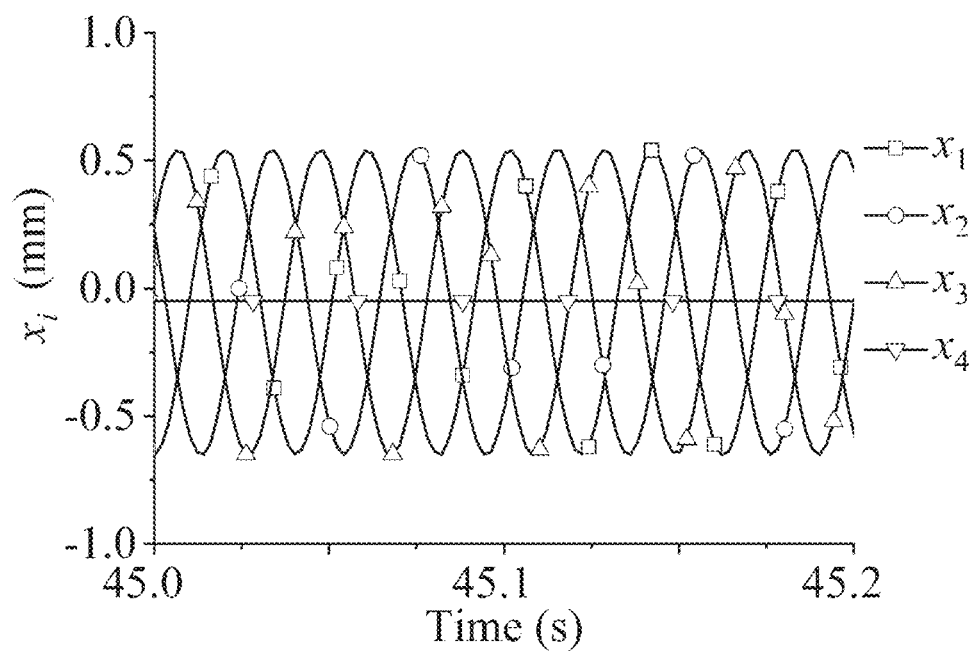
FIG. 30: partial enlarged view of the rear part of displacement of area 2(b) in x direction.

FIGS. 28, 29 and 30 show the displacements of mass bodies 1, 2, and 3 in x direction. It can be seen from the partial enlarged view of the displacement relationship that the displacements among mass bodies 1, 2, and 3 are equal, and the displacement direction of mass body 4 is opposite to the moving direction of mass bodies 1, 2, and 3; after interference is added at 30 s, the displacements are changed, mass body 4 is in stationary state, and the displacements of mass bodies 1, 2, and 3 are equal.

Figure 31:
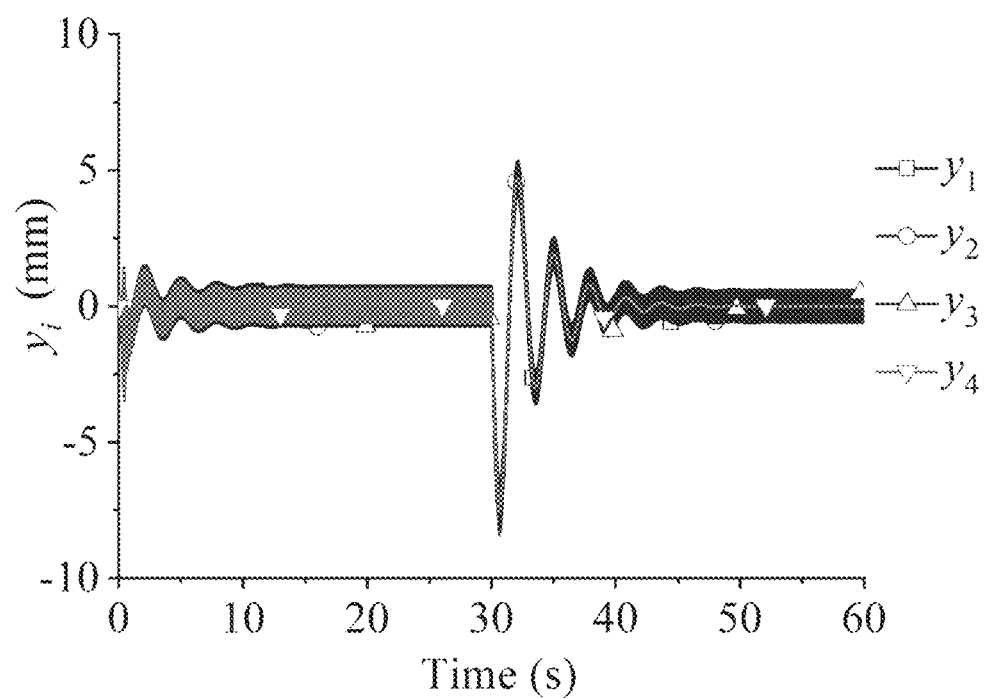
FIG. 31: displacement of area 2(b) in y direction.
Figure 32:
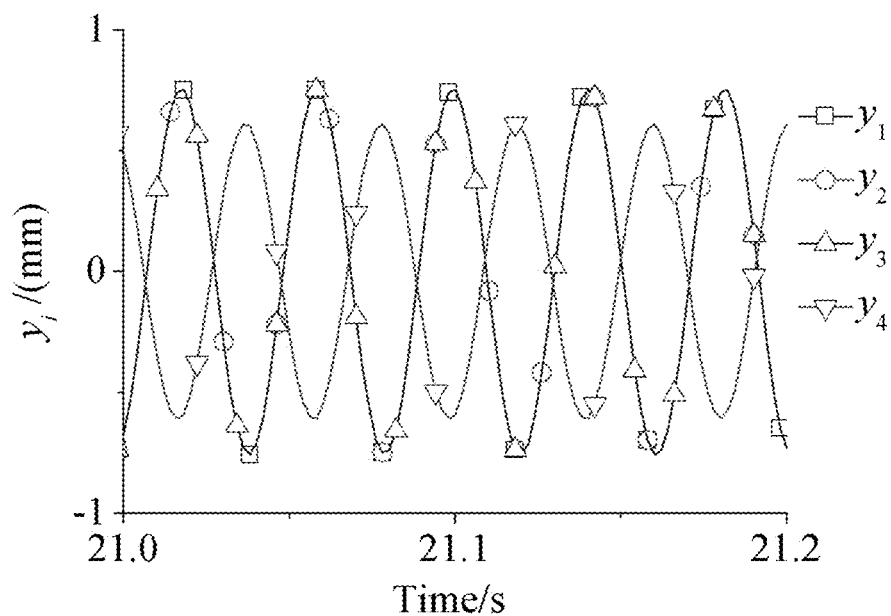
FIG. 32: partial enlarged view of the front part of displacement of area 2(b) in y direction.
Figure 33:
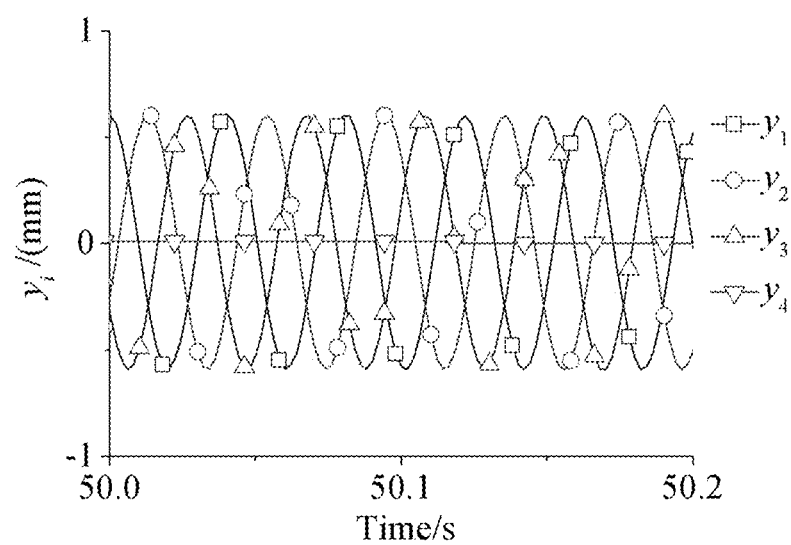
FIG. 33: partial enlarged view of the rear part of displacement of area 2(b) my direction.
Figure 34:
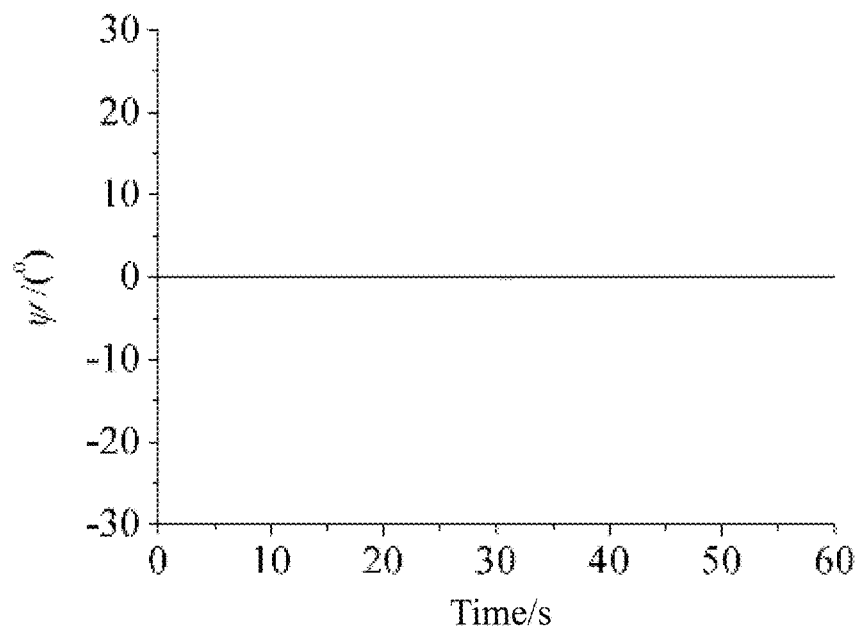
FIG. 34: oscillating displacement of area 2(b)

FIGS. 31, 32, and 33 show the displacements of mass bodies 1, 2, and 3 in y direction. It can be seen from the partial enlarged view of the displacement relationship that the displacements among mass bodies 1, 2, and 3 are equal, and the displacement direction of mass body 4 is opposite to the moving direction of mass bodies 1, 2, and 3; after interference is added at 30 s, the displacements are changed, mass body 4 is in stationary state, and the displacements of mass bodies 1, 2, and 3 are equal. FIG. 34 shows the oscillating angle of the system. It can be seen that the oscillating angle is near 0° and is not changed significantly after the addition of interference.

Simulation is performed to area 3, assuming $k_0$=3200 KN/m, $k_4$=30 KN/m, and $k_\psi$=2000 KN/m. The rotational speed of the motors corresponding to the simulation result is 982 r/min. Through calculation, the rotational speed corresponds to 376 rad/s in the phase difference diagram of numerical analysis at this time.

Figure 35:
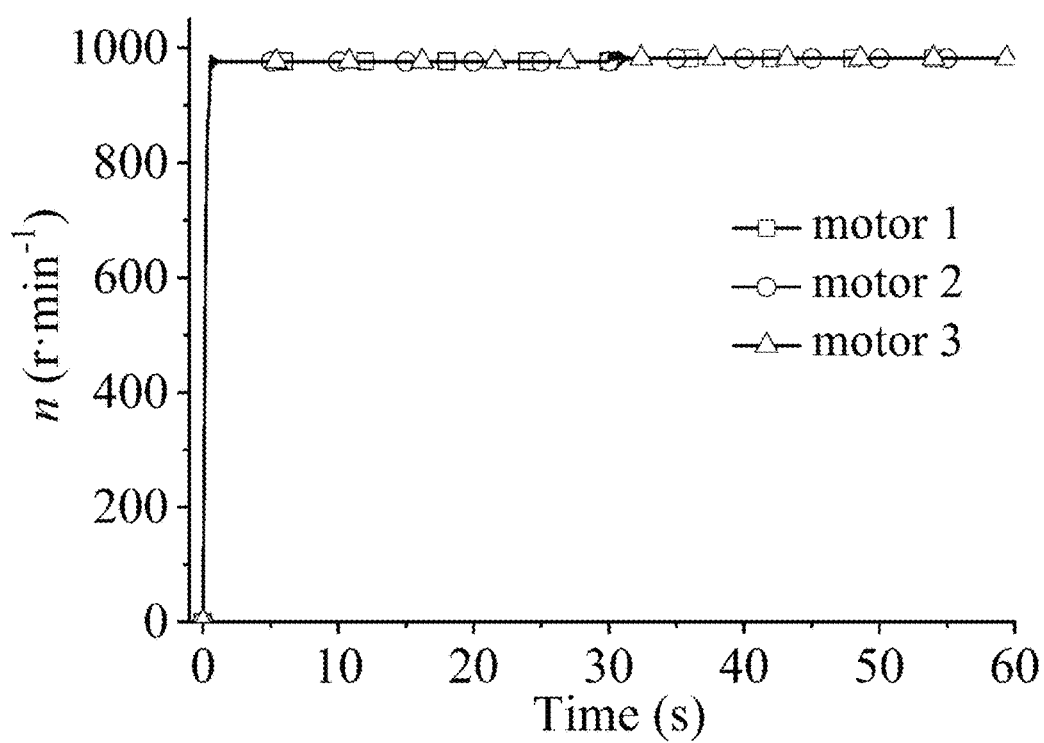
FIG. 35: rotational speeds of three motors in area 3.

FIG. 35 shows the stable state of the speed of two exciters. The speed of the two exciters becomes stable quickly in a short time, and the synchronization speed is basically stabilized at 982 r/min; after interference is added on exciter 2 at 30 s, the rotational speed is not changed significantly.

Figure 36:
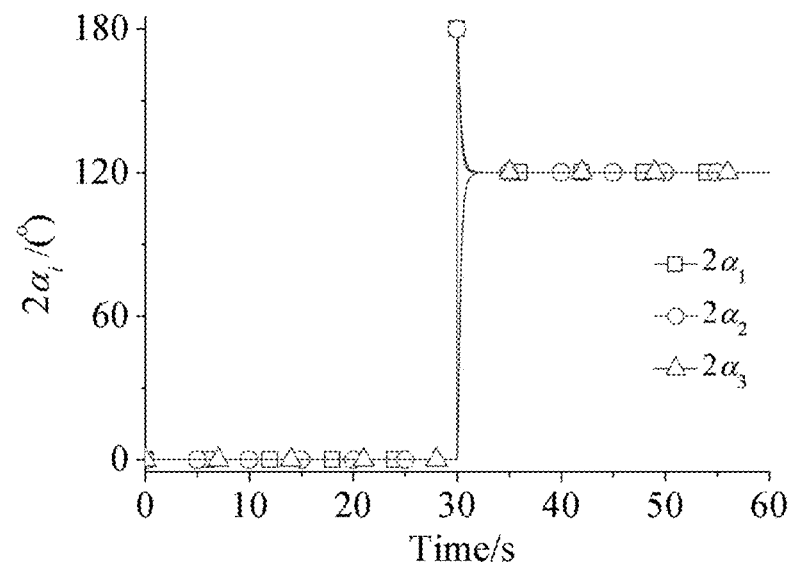
FIG. 36: phase difference among three exciters in area 3.

FIG. 36 shows the stable state of the phase difference. The phase difference between exciters 1 and 2, exciters 2 and 3, exciters 1 and 3 is 0°; after interference is added at 30 s, the phase difference is suddenly changed to 120°.

Figure 37:
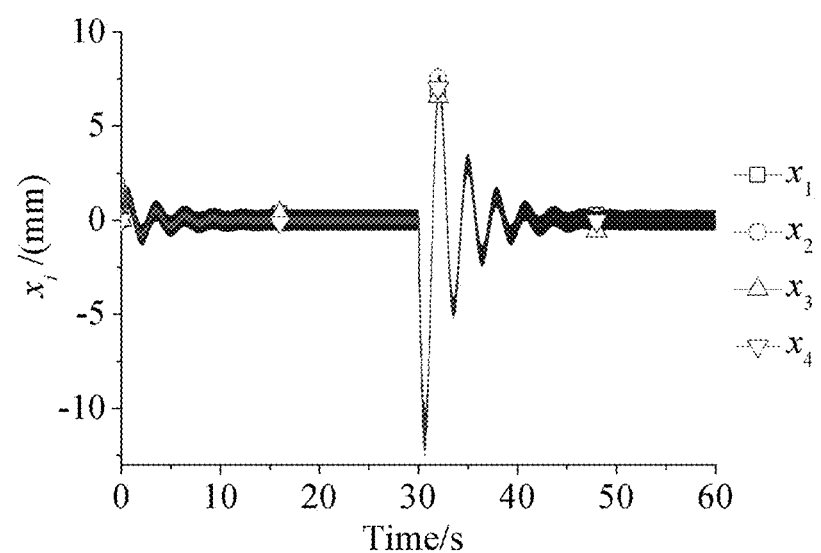
FIG. 37: displacement of area 3 in x direction.
Figure 38:
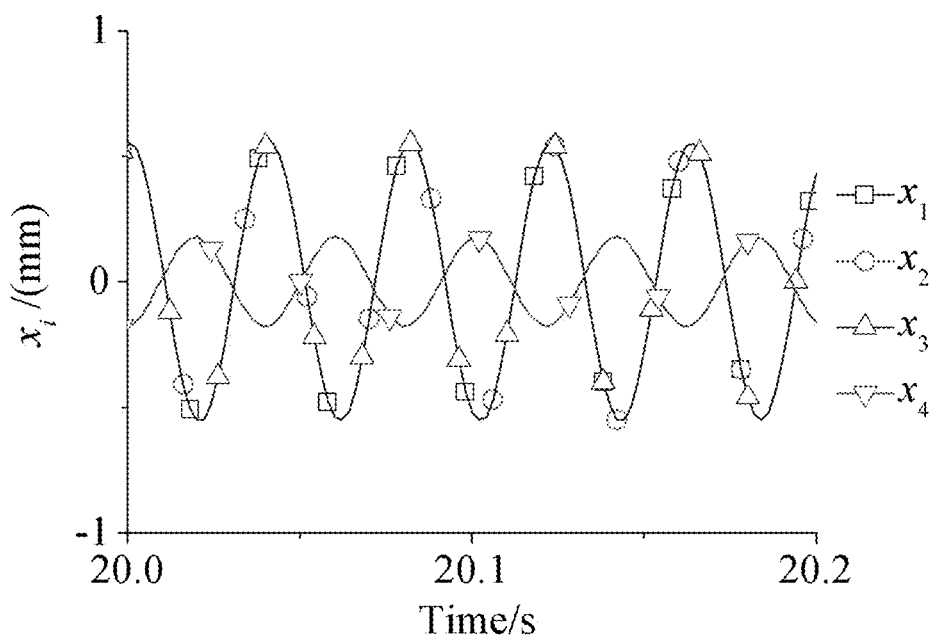
FIG. 38: partial enlarged view of the front part of displacement of area 3 in x direction.
Figure 39:
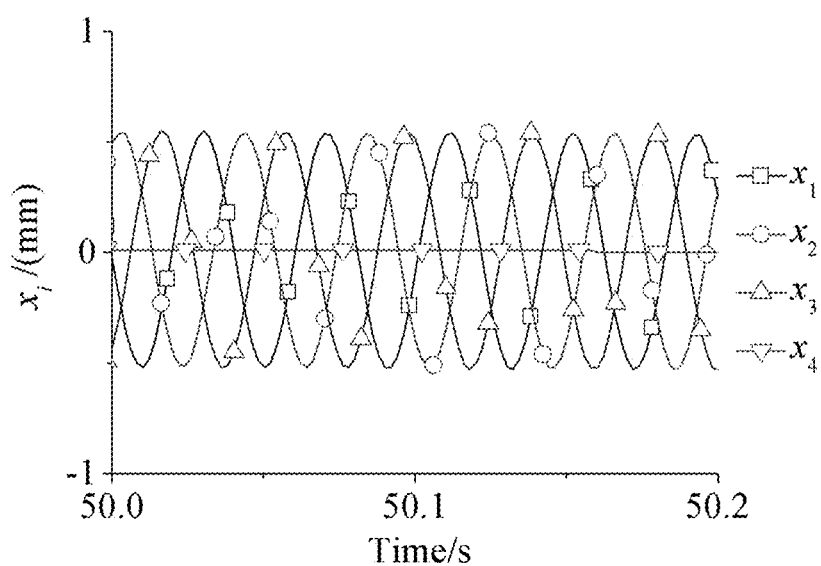
FIG. 39: partial enlarged view of the rear part of displacement of area 3 in x direction.

FIGS. 37-39 show the displacements of mass bodies 1, 2, and 3 in x direction. It can be seen from the partial enlarged view of the displacement relationship that the displacements among mass bodies 1, 2, and 3 are equal, and the displacement direction of mass body 4 is opposite to the moving direction of mass bodies 1, 2, and 3; after interference is added at 30 s, mass body 4 is in stationary state, and the displacements of mass bodies 1, 2, and 3 are equal.

Figure 40:
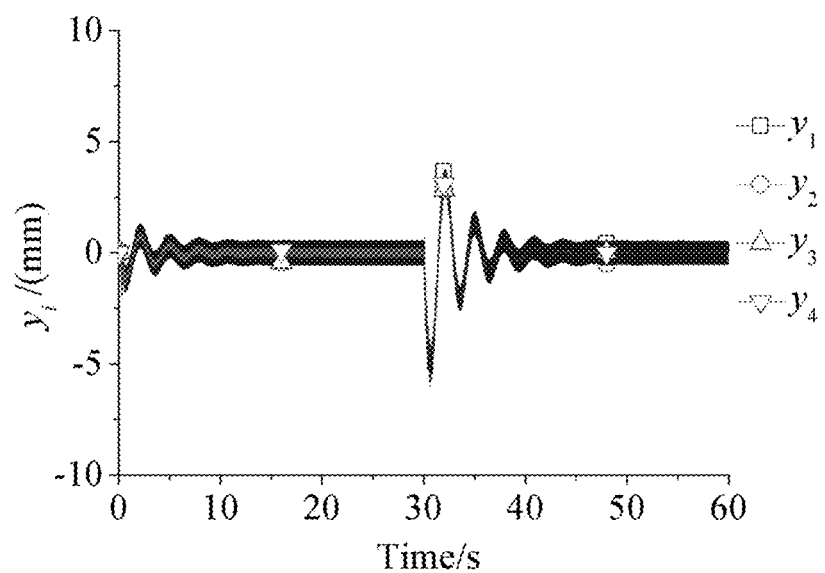
FIG. 40: displacement of area 3 in y direction.
Figure 41:
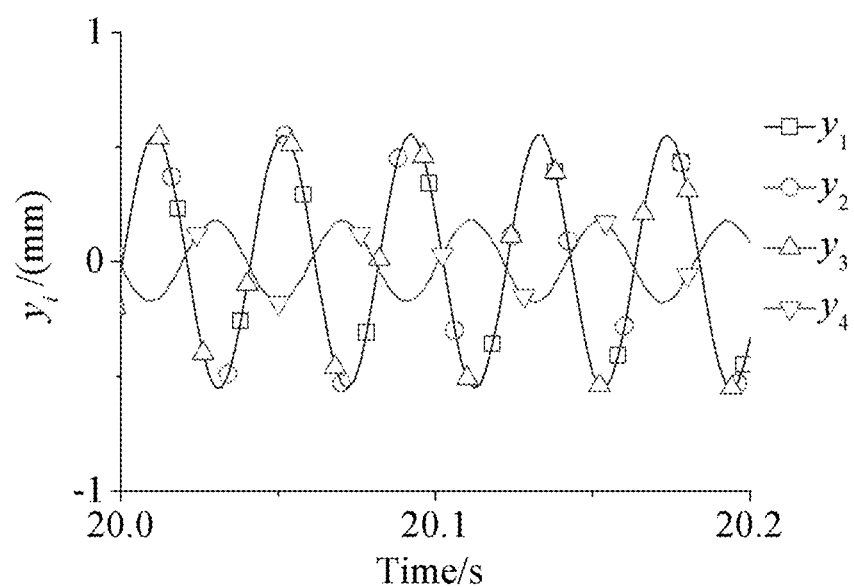
FIG. 41: partial enlarged view of the front part of displacement of area 3 in y direction.
Figure 42:
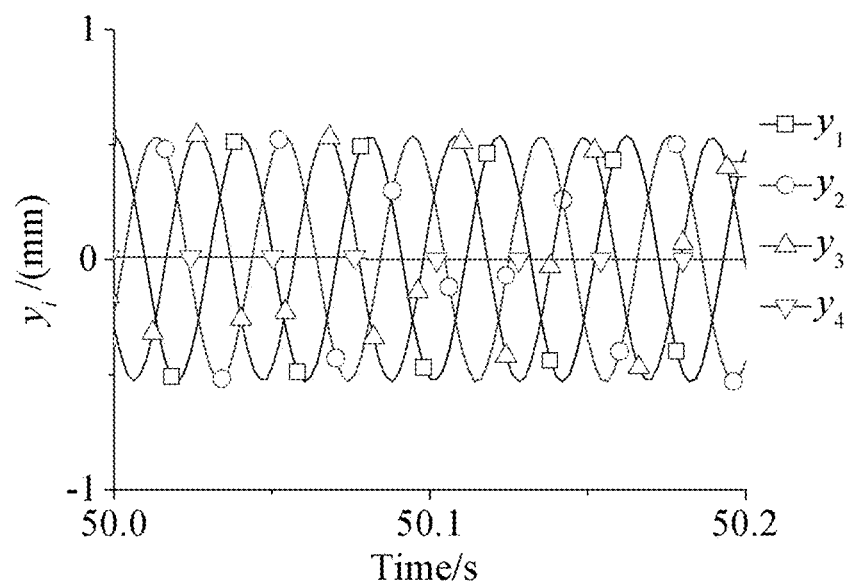
FIG. 42: partial enlarged view of the rear part of displacement of area 3 in y direction.

FIGS. 40, 41, and 42 show the displacements of mass bodies 1, 2, and 3 in y direction. It can be seen from the partial enlarged view of the displacement relationship that the displacements among mass bodies 1, 2, and 3 are equal, and the displacement direction of mass body 4 is opposite to the moving direction of mass bodies 1, 2 and 3; after interference is added at 30 s, the displacements are changed, mass body 4 is in stationary state, and the displacements of mass bodies 1, 2, and 3 are equal.

Figure 43:
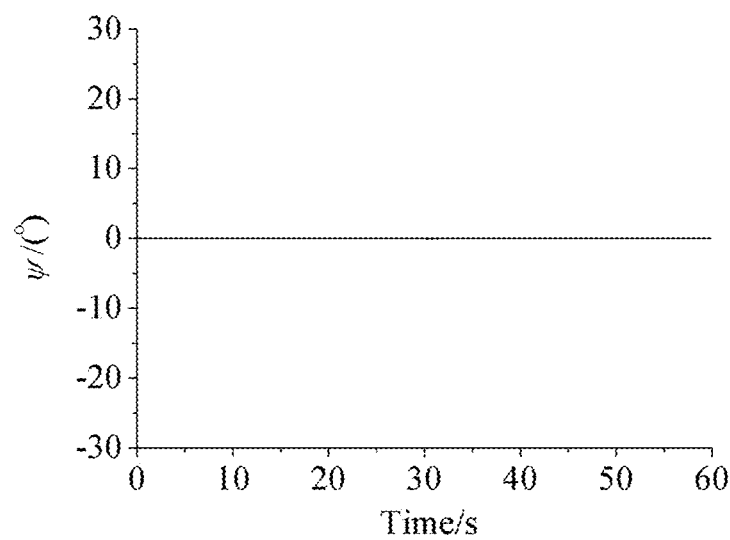
FIG. 43: oscillating displacement of area 3.

FIG. 43 shows the oscillating angle of the system. It can be seen that the oscillating angle is near 0° and is not changed significantly after the addition of interference.

System simulation results show that the phase differences of area 1, area 3 and the second half of area 2 does not return to the original state after interference, while in the first half of area 2, the system is still stable after applying interference; at the same time, we can observe that in the working region of the first half of area 2, the displacements of mass bodies 1, 2, and 3 in x and y directions are equal and equidirectional, while mass body 4 has large displacements in x and y directions and reverse vibration.

Conclusion (1) According to the comparison between the results of step 4 and step 5, the numerical and simulation results are the same. Therefore, the method for determining parameters of the present invention is correct.

(2) The present invention provides a new model of vibrating mill, which uses three motors to drive four mass bodies. According to the establishment of motion differential equations, numerical analysis, and simulation, it is concluded that the phase differences in the area 1, area 3, and the second half of working area 2 in the present invention cannot return to the original state after interference, so the stability is insufficient. Therefore, the working area should be selected in the first half of area 2, and the motion state of the vibrating mill during operation can be analyzed.

(3) It is known from the simulation results that the moving direction of mass bodies 1, 2, 3 is opposite to that of the mass body 4 (the mill body), and the amplitude of the mill body is large so that medium and materials are fully ground, and the grinding accuracy is improved, thus proving the rationality of the model of the present invention.

(4) The research content of the present invention has a significant directive function for the design of structural parameters of vibrating mill devices and the selection of working areas.

Embodiment 3: Example Data and Parameters of a Vibrating Feeder. The Present Invention is not Limited to the Design Parameters Herein Spring stiffnesses: $k_0$=9000 KN/m, $k_4$=30 KN/m, $k_\psi$=3000 KN/m, and $k_1$=$k_2$=$k_3$=$k_0$;

Damping coefficient:

Masses of mass bodies: $m_1$=$m_2$=$m_3$=1400 kg, and $m_4$=2000 kg;

r=0.15 m; $l_0$=1.1 m; Synchronization speed: $\omega_{m0}$=790 r/min to 811 r/min;

Masses of unbalanced rotors of exciters: $m_{01}$=$m_{02}$=$m_{03}$=10 kg; and

Motor parameters: rotor resistance $R_r$=3.40Ω, stator resistance $R_s$=3.35Ω, rotor inductance $L_r$=170 mH, stator inductance $L_s$=170 mH, and mutual inductance $L_m$=164 mH.

The two motors are of the same type and are three-phase squirrel-cage motors (VB-1082-W type, 380 V, 50 Hz, 6-pole, Δ-connection, 0.75 kw, 980 r/min, and 39 kg).

The invention claimed is:

1. A method for determining parameters of a high-frequency vibrating mill with three grinding drums, wherein a dynamic model of the vibrating mill comprises three exciters, four mass bodies and springs; mass body 1, mass body 2 and mass body 3 are respectively three grinding drums and are all connected with mass body 4 through springs, where mass body 4 is connected with foundation through a spring; the three exciters are respectively located on mass body 1, mass body 2, and mass body 3; the three exciters rotate in the same direction, and each exciter rotates about its rotation axis; a method for determining parameters of the exciters, comprising the following steps:

step 1: establishing a dynamic model and motion differential equations of the system establishing two rectangular coordinate systems, the three exciters rotate in the same direction, and the motion of each body is divided into vibration in x and y directions and oscillation around the mass center, represented by x, y and ψ respectively;

selecting x, y, ψ, $\varphi_1$, $\varphi_2$ and $\varphi_3$ as generalized coordinates, solving the kinetic energy, potential energy, and energy dissipation functions of a system, and substituting the functions into Lagrange equations to obtain differential equations of motion of the system;

$$M_1\ddot{x}_1 + f_1(\dot{x}_1 - \dot{x}_4) + k_1(x_1 - x_4) = m_{01}r(\dot{\varphi}_1^2\cos\varphi_1 + \ddot{\varphi}_1\sin\varphi_1) \quad (1)$$

$$M_2\ddot{x}_2 + f_2(\dot{x}_2 - \dot{x}_4) + k_2(x_2 - x_4) = m_{02}r(\dot{\varphi}_2^2\cos\varphi_2 + \ddot{\varphi}_2\sin\varphi_2)$$

$$M_3\ddot{x}_3 + f_3(\dot{x}_3 - \dot{x}_4) + k_3(x_3 - x_4) = m_{03}r(\dot{\varphi}_3^2\cos\varphi_3 + \ddot{\varphi}_1\sin\varphi_3)$$

$$M_4\ddot{x}_4 - f_1(\dot{x}_1 - \dot{x}_4) - k_1(x_1 - x_4) - f_2(\dot{x}_2 - \dot{x}_4) -$$

$$k_2(x_2 - x_4) - f_3(\dot{x}_3 - \dot{x}_4) - k_3(x_3 - x_4) + f_4\dot{x}_4 + k_4x_4 = 0$$

$$M_1\ddot{y}_1 + f_1(\dot{y}_1 - \dot{y}_4) + k_1(y_1 - y_4) = m_{*1}r(\dot{\varphi}_1^2\sin\varphi_1 - \ddot{\varphi}_1\cos\varphi_1)$$

$$M_2\ddot{y}_2 + f_2(\dot{y}_2 - \dot{y}_4) + k_2(y_2 - y_4) = m_{02}r(\dot{\varphi}_2^2\sin\varphi_2 - \ddot{\varphi}_2\cos\varphi_2)$$

-continued $$M_3\ddot{y}_3 + f_3(\dot{y}_3 - \dot{y}_4) + k_3(y_3 - y_4) = m_{*3}r(\dot{\varphi}_3^2\sin\varphi_3 - \ddot{\varphi}_3\cos\varphi_3)$$

$$M_4\ddot{y}_4 - f_1(\dot{y}_1 - \dot{y}_4) - k_1(y_1 - y_4) - f_2(\dot{y}_2 - \dot{y}_4) -$$

$$k_2(y_2 - y_4) - f_3(\dot{y}_3 - \dot{y}_4) - k_3(y_3 - y_4) + f_4\dot{y}_4 + k_4y_4 = 0$$

$$J\ddot{\psi} + f_\psi\dot{\psi} + k_\psi\psi = l_*r\sum_{i=1}^{3}m_i\left[\ddot{\varphi}_i\cos(\varphi_i - \beta_i) - \dot{\varphi}_i^2\sin(\varphi_i - \beta_i)\right]$$

$$J_{oi}\ddot{\varphi}_i + f_{di}\dot{\varphi}_i = m_{oi}r\left[\ddot{y}_i\cos\varphi_i - \ddot{x}_i\sin\varphi_i - l_0\ddot{\psi}\cos(\varphi_i - \beta_i) + l_0\dot{\psi}^2\sin(\varphi_i - \beta_i)\right]$$

wherein $m_{0i}$—mass of each exciter (i=1~3); $m_i$—mass of each mass body (i=1~4);

$M_1$=$m_1$+$m_{01}$, $M_2$=$m_2$+$m_{02}$, $M_3$=$m_3$+$m_{03}$, and $M_4$=$m_4$+$m_{01}$+$m_{02}$+$m_{03}$ J=$J_{m4}$+($m_{01}$+$m_{02}$+$m_{03}$)($r^2$+$l^2$)—moment of inertia of a vibrating rigid body;

$J_{oi}$=$m_{oi}r_i^2$—moment of inertia of each exciter (i=1~3);

$$k_\psi = \frac{1}{2}k_4(l_{x3}^2 + l_{y3}^2);$$

$l_0$—distance from rotation axis of each excited rotor to the mass center of total vibrating system;

$\dot{x}_i$: vibration velocity of mass body i in x-direction, i=1, 2, 3, 4;

$\ddot{x}_i$: vibration acceleration of mass body i in x-direction, i=1, 2, 3, 4;

$\dot{y}_i$: vibration velocity of mass body i in y-direction, i=1, 2, 3, 4;

$\ddot{y}_i$: vibration acceleration of mass body i in y-direction, i=1, 2, 3, 4;

$k_i$ (1=1~4)—spring stiffness coefficient;

$$f_\psi = \frac{1}{2}(f_1 + f_2 + f_3)(l_{x1}^2 + l_{x2}^2 + l_{y1}^2 + l_{y2}^2) +$$

$$\frac{1}{2}f_4(l_{x3}^2 + l_{y3}^2) - \frac{1}{2}(f_1 + f_2 + f_3)(l_{x1}l_{x2} + l_{y1}l_{y2});$$

$f_i$(i=1~4)—damping coefficient;

$\varphi_i$—phase angle of exciter i (i=1~3); $\dot{\varphi}_i$—angular velocity of exciter i (i=1~3); $\ddot{\varphi}_i$—angular acceleration of exciter i (i=1-3);

step 2: synchronization analysis letting the phase difference between exciter 1 and exciter 2 be $2\alpha_1$, the phase difference between exciter 2 and exciter 3 be $2\alpha_2$, and the average phase difference among the three exciters be φ;

$$\varphi_1 - \varphi_2 = 2\alpha_1, \varphi_2 - \varphi_3 = 2\alpha_2, \text{ and } \varphi = \frac{1}{3}\sum_{i=1}^{3}\varphi_i$$

rearranging the above equations to obtain $$\varphi_1 = \varphi + \frac{4}{3}\alpha_1 + \frac{2}{3}\alpha_2 = \varphi + \upsilon_1 \quad (2)$$

$$\varphi_2 = \varphi - \frac{2}{3}\alpha_1 + \frac{2}{3}\alpha_2 = \varphi + \upsilon_2$$

$$\varphi_3 = \varphi - \frac{2}{3}\alpha_1 - \frac{4}{3}\alpha_2 = \varphi + \upsilon_3$$

using the transfer function method to obtain the response of the system:

$$x_1 = F_1 r \cos(\varphi_1 - \gamma_1) + F_5 r \cos(\varphi_2 - \gamma_5) + F_9 r \cos(\varphi_3 - \gamma_9) \quad (3)$$

$$x_2 = F_2 r \cos(\varphi_1 - \gamma_2) + F_6 r \cos(\varphi_2 - \gamma_6) + F_{10} r \cos(\varphi_3 - \gamma_{10})$$

$$x_3 = F_3 r \cos(\varphi_1 - \gamma_3) + F_7 r \cos(\varphi_2 - \gamma_7) + F_{11} r \cos(\varphi_3 - \gamma_{11})$$

$$x_4 = F_4 r \cos(\varphi_1 - \gamma_4) + F_8 r \cos(\varphi_2 - \gamma_8) + F_{12} r \cos(\varphi_3 - \gamma_{12})$$

$$y_1 = F_1 r \cos(\varphi_1 - \gamma_1) + F_5 r \cos(\varphi_2 - \gamma_5) + F_9 r \cos(\varphi_3 - \gamma_9)$$

$$y_2 = F_2 r \cos(\varphi_1 - \gamma_2) + F_6 r \cos(\varphi_2 - \gamma_6) + F_{10} r \cos(\varphi_3 - \gamma_{10})$$

$$y_3 = F_3 r \cos(\varphi_1 - \gamma_3) + F_7 r \cos(\varphi_2 - \gamma_7) + F_{11} r \cos(\varphi_3 - \gamma_{11})$$

$$y_4 = F_4 r \cos(\varphi_1 - \gamma_4) + F_8 r \cos(\varphi_2 - \gamma_8) + F_{12} r \cos(\varphi_3 - \gamma_{12})$$

$$\psi = \frac{r_m r_l r}{\mu_\psi l_e} \sum_{i=1}^{3} \sin(\varphi_i - \beta_i + \gamma_{13})$$

determining intermediate parameters:

$$a = M_4 M_0^3 \omega_{m0}^8 - (3f_0^2 M_4 M_0 + 9f_0^2 M_0^2 + 3k_0 M_0^3 + 3M_4 M_0^2 k_0 + k_4 M_0^3)\omega_{m0}^6 +$$
$$(3f_0^2 k_4 M_0 + 6k_0^2 M_0^2 + 15f_0^2 k_0 M_0 + 3M_4 M_0 k_0^2 + f_0^4 + 3k_4 M_0^2 k_0 + 3f_0^2 M_4 k_0)$$
$$\omega_{m0}^4 - (3f_0^2 k_0^2 + 3k_4 M_0 k_0^2 + M_4 k_0^3 + 3k_0^3 M_0 + 3f_0^2 k_4 k_0)\omega_{m0}^2 + k_4 k_0^3$$

$$b = -(3M_4 M_0^2 f_0 + 4f_0 M_0^3)\omega_{m0}^7 +$$
$$(6M_4 M_0 k_0 f_0 + 15 f_0 M_0^2 k_0 + 3k_4 M_0^2 f_0 + 6f_0^3 M_0 + f_0^3 M_4)\omega_{m0}^5 -$$
$$(6k_4 M_0 k_0 f_0 + 12 f_0 k_0^2 M_0 + 3f_0^3 k_0 + 3M_4 k_0^2 f_0 + f_0^3 k_4)\omega_{m0}^3 +$$
$$(f_0 k_0^3 + 3k_4 k_0^2 f_0)\omega_{m0}$$

$$c_1 = -M_4 M_0^2 \omega_{m0}^6 + (2M_4 M_0 k_0 + 3k_0 M_0^2 + f_0^2 M_4 + 6f_0^2 M_0 + k_4 M_0^2)\omega_{m0}^4 -$$
$$(M_4 k_0^2 + 4k_0^2 M_0 + 2k_4 M_0 k_0 + f_0^2 k_4 + 5f_0^2 k_0)\omega_{m0}^2 + k_4 k_0^2 + k_0^3$$

$$d_1 = 2f_0 M_4 M_0 + 4f_0 M_0^2)\omega_{m0}^5 - (2f_0 k_4 M_0 + 2f_0 M_4 k_0 + 2f_0^3 + 10f_0 M_0 k_0)$$
$$\omega_{m0}^3 + 2f_0 k_4 k_0 + 4f_0 k_0^2$$

$$e_1 = f_0^2 M_0 \omega_{m0}^4 - (k_0^2 M_0 + 3f_0^2 k_0)\omega_{m0}^2 + k_0^3$$

$$f_1 = -(2f_0 M_0 k_0 + f_0^3)\omega_{m0}^3 + 3f_0 k_0^2 \omega_{m0}$$

$$h_1 = f_0^2 M_0 \omega_{m0}^4 - (k_0^2 M_0 + 3f_0^2 k_0)\omega_{m0}^2 + k_0^3$$

$$p_1 = -(2f_0 M_0 k_0 + f_0^3)\omega_{m0}^3 + 3f_0 k_0^2 \omega_{m0}$$

$$u_1 = (k_0 M_0^2 + 2f_0^2 M_0)\omega_{m0}^4 - (3f_0^2 k_0 + 2k_0^2 M_0)\omega_{m0}^2 + k_0^3$$

$$z_1 = f_0 M_0^2 \omega_{m0}^5 - (f_0^3 + 4f_0 M_0 k_0)\omega_{m0}^3 + 3f_0 k_0^2 \omega_{m0}$$

$$c_2 = e_1, \ d_2 = f_1, \ e_2 = c_1, \ f_2 = d_1, \ h_2 = e_1, \ p_2 = f_1, \ u_2 = u_1, \ z_2 = z_1,$$

$$c_3 = e_1, \ d_3 = f_1, \ e_3 = e_1, \ f_2 = f_1, \ h_3 = c_1, \ p_3 = d_1, \ u_3 = u_1, \ z_3 = z_1$$

$$\gamma_1 = \begin{cases} \arctan\frac{bc_1 - ad_1}{ac_1 + bd_1}, & ac_1 + bd_1 > 0 \\ \pi + \arctan\frac{bc_1 - ad_1}{ac_1 + bd_1}, & ac_1 + bd_1 < 0 \end{cases},$$

$$\gamma_2 = \begin{cases} \arctan\frac{be_1 - af_1}{ae_1 + bf_1}, & ae_1 + bf_1 > 0 \\ \pi + \arctan\frac{be_1 - af_1}{ae_1 + bf_1}, & ae_1 + bf_1 < 0 \end{cases}$$

$$\gamma_3 = \begin{cases} \arctan\frac{bh_1 - ap_1}{ah_1 + bp_1}, & ah_1 + bp_1 > 0 \\ \pi + \arctan\frac{bh_1 - ap_1}{ah_1 + bp_1}, & ah_1 + bp_1 < 0 \end{cases}, \quad (4)$$

$$\gamma_4 = \begin{cases} \arctan\frac{bu_1 - az_1}{az_1 + bu_1}, & az_1 + bu_1 > 0 \\ \pi + \arctan\frac{bu_1 - az_1}{az_1 + bu_1}, & az_1 + bu_1 < 0 \end{cases}$$

$\gamma_5 = \gamma_2$, $\gamma_6 = \gamma_1$, $\gamma_7 = \gamma_2$, $\gamma_8 = \gamma_1$, $\gamma_9 = \gamma_2$, $\gamma_{10} = \gamma_2$, $\gamma_{11} = \gamma_1$, $\gamma_{12} = \gamma_4$,
wherein $\gamma_i$ (i=1~4)—lag angle;

$$M = \begin{pmatrix} M_0 & & & \\ & M_0 & & \\ & & M_0 & \\ & & & M_4 \end{pmatrix}, K = \begin{pmatrix} k_0 & & & -k_0 \\ & k_0 & & -k_0 \\ & & k_0 & -k_0 \\ -k_0 & -k_0 & -k_0 & 3k_0 + k_4 \end{pmatrix} \quad (5)$$

$$\Delta(\omega^2) = \begin{pmatrix} k_0 - M_0\omega^2 & & & -k_0 \\ & k_0 - M_0\omega^2 & & -k_0 \\ & & k_0 - M_0\omega^2 & -k_0 \\ -k_0 & -k_0 & -k_0 & 3k_0 + k_4 - M_0\omega^2 \end{pmatrix}$$

wherein, M—mass coupling matrix, K—stiffness coupling matrix, and $\Delta(\omega^2)$ is an eigenvalue equation, letting the eigenvalue equation be equal to 0, i.e., $\Delta(\omega^2)=0$:

$$k_0^3 k_4 - k_0^3 \omega_{m0}^2 M_4 - 3\omega_{m0}^2 M_0 k_0^3 - 3k_0^2 \omega_{m0}^2 M_0 k_4 +$$
$$3k_0^2 \omega_{m0}^2 M_0 M_4 + 6\omega_{m0}^4 M_0^2 k_0^2 + 3k_0 \omega_{m0}^4 M_0^2 k_4 -$$
$$3k_0 \omega_{m0}^6 M_0^2 M_4 - 3\omega_{m0}^6 M_0^3 k_0 - \omega_{m0}^6 M_0^3 k_4 +$$
$$\omega_{m0}^8 M_0^3 M_4 = 0$$

obtaining inherent frequency:

$$\omega_1 = \omega_2 = \omega_0 = \sqrt{\frac{k_0}{M_0}} \quad (6)$$

$$\omega_3 = \sqrt{\frac{3M_0 k_0 + k_0 M_4 + k_0 M_4 + \sqrt{(3M_0 k_0 + k_0 M_4)^2 + M_0 k_4(6M_0 k_0 + M_0 k_4 - 2k_0 M_4)}}{M_0 M_4}}$$

$$\omega_4 = \sqrt{\frac{3M_0 k_0 + k_0 M_4 + k_0 M_4 - \sqrt{(3M_0 k_0 + k_0 M_4)^2 + M_0 k_4(6M_0 k_0 + M_0 k_4 - 2k_0 M_4)}}{M_0 M_4}}$$

when the three exciters can operate synchronously, $\dot{\varphi}=\omega_{m0}$, taking the second derivative of $x_1$, $x_2$, $x_3$, $y_1$, $y_2$, $y_3$ and $\psi$ to time t, which is substituted into the equations with respect to $\varphi_i$, then integrating the equations over $\varphi=0 \cdot 2\pi$, after taking the average value and arranging the equations, the equilibrium equations of the three exciters are obtained as follows:

$T_{e01} - f_{01}\omega_{m0} = \overline{T}_{L1}$ $T_{e02} - f_{02}\omega_{m0} = \overline{T}_{L2}$ $T_{e03} - f_{03}\omega_{m0} = \overline{T}_{L3}$ (7)

wherein $\overline{T}_{L1} = T_u\{2F_2[\sin(2\alpha_1+2\alpha_2)+\sin(2\alpha_1)]\cos\gamma_2+2F_2[\cos(2\alpha_1+2\alpha_2)+\cos(2\alpha_1)]\sin\gamma_2-l_0F_{13}[\sin(2\alpha_1+2\alpha_2-\beta_1+\beta_3)+\sin(2\alpha_1-\beta_1+\beta_2)]\cos\gamma_{13}+2F_1\sin\gamma_1-l_0F_{13}[\cos(2\alpha_1+2\alpha_2-\beta_1+\beta_3)+\cos(2\alpha_1-\beta_1+\beta_2)]\sin\gamma_{13}-l_0F_{13}\sin\gamma_{13}\}$ $\overline{T}_{L2} = T_u\{2F_2[\sin(2\alpha_2)-\sin(2\alpha_1)]\cos\gamma_2+2F_2[\cos(2\alpha_2)+\cos(2\alpha_1)]\sin\gamma_2+l_0F_{13}[\sin(2\alpha_1-\beta_1+\beta_2)-\sin(2\alpha_2-\beta_2+\beta_3)]\cos\gamma_{13}+2F_1\sin\gamma_1-l_0F_{13}[\cos(2\alpha_1-\beta_1+\beta_3)+\cos(2\alpha_2-\beta_2+\beta_3)]\sin\gamma_{13}-l_0F_{13}\sin\gamma_{13}\}$ $\overline{T}_{L3} = T_u\{-2F_2[\sin(2\alpha_1+2\alpha_2)+\sin(2\alpha_2)]\cos\gamma_2+2F_2[\cos(2\alpha_1+2\alpha_2)+\cos(2\alpha_2)]\sin\gamma_2+l_0F_{13}[\sin(2\alpha_1+2\alpha_2-\beta_1+\beta_3)+\sin(2\alpha_2-\beta_2+\beta_3)]\cos\gamma_{13}+2F_1\sin\gamma_1-l_0F_{13}[\cos(2\alpha_1+2\alpha_2-\beta_1+\beta_3)+\cos(2\alpha_2-\beta_2+\beta_3)]\sin\gamma_{13}-l_0F_{13}\sin\gamma_{13}\}$ (8)

the differences of output torques among the exciters are:

$\Delta T_{12} = \overline{T}_{L1} - \overline{T}_{L2} = T_u\{4F_2\sin(2\alpha_1)\cos\gamma_2 - 2l_0F_{13}\sin(2\alpha_1-\beta_1+\beta_2)\cos\gamma_{13}+l_0F_{13}[\sin(2\alpha_2-\beta_2+\beta_3)-\sin(2\alpha_1+2\alpha_2-\beta_1+\beta_3)]\cos\gamma_{13}+l_0F_{13}[\cos(2\alpha_2-\beta_2+\beta_3)-\cos(2\alpha_1+2\alpha_2-\beta_1+\beta_3)]\sin\gamma_{13}+2F_2[\sin(2\alpha_1+2\alpha_2)-\sin(2\alpha_2)]\cos\gamma_2+2F_2[\cos(2\alpha_1+2\alpha_2)-\cos(2\alpha_2)]\sin\gamma_2\}$ (9)

$\Delta T_{23} = \overline{T}_{L2} - \overline{T}_{L3} = T_u\{4F_2\sin(2\alpha_2)\cos\gamma_2 - 2l_0F_{13}\sin(2\alpha_2-\beta_2+\beta_3)\cos\gamma_{13}+l_0F_{13}[\sin(2\alpha_1-\beta_1+\beta_2)-\sin(2\alpha_1+2\alpha_2-\beta_1+\beta_3)]\cos\gamma_{13}-l_0F_{13}[\cos(2\alpha_1-\beta_1+\beta_2)-\cos(2\alpha_1+2\alpha_2-\beta_1+\beta_3)]\sin\gamma_{13}+2F_2[\sin(2\alpha_1+2\alpha_2)-\sin(2\alpha_1)]\cos\gamma_2-2F_2[\cos(2\alpha_1+2\alpha_2)-\cos(2\alpha_1)]\sin\gamma_2\}$ (10)

arranging the above two equations to obtain:

$\dfrac{\Delta T_{012}}{T_u} = \tau_{c12}(\overline{\alpha}_1, \overline{\alpha}_2), \dfrac{\Delta T_{023}}{T_u} = \tau_{c23}(\overline{\alpha}_1, \overline{\alpha}_2)$ (11)

wherein, $\tau_{c12} = 4F_2\sin(2\alpha_1)\cos\gamma_2 - 2l_0F_{13}\sin(2\alpha_1-\beta_1+\beta_2)\cos\gamma_{13}+l_0F_{13}[\sin(2\alpha_2-\beta_2+\beta_3)-\sin(2\alpha_1+2\alpha_2-\beta_1+\beta_3)]\cos\gamma_{13}+l_0F_{13}[\cos(2\alpha_2-\beta_2+\beta_3)-\cos(2\alpha_1+2\alpha_2-\beta_1+\beta_3)]\sin\gamma_{13}+2F_2[\sin(2\alpha_1+2\alpha_2)-\sin(2\alpha_2)]\cos\gamma_2+2F_2[\cos(2\alpha_1+2\alpha_2)-\cos(2\alpha_2)]\sin\gamma_2$ (12)

$\tau_{c23} = 4F_2\sin(2\alpha_2)\cos\gamma_2 - 2l_0F_{13}\sin(2\alpha_2-\beta_2+\beta_3)\cos\gamma_{13}+l_0F_{13}[\sin(2\alpha_1-\beta_1+\beta_2)-\sin(2\alpha_1+2\alpha_2-\beta_1+\beta_3)]\cos\gamma_{13}-l_0F_{13}[\cos(2\alpha_1-\beta_1+\beta_2)-\cos(2\alpha_1+2\alpha_2-\beta_1+\beta_3)]\sin\gamma_{13}+2F_2[\sin(2\alpha_1+2\alpha_2)-\sin(2\alpha_1)]\cos\gamma_2-2F_2[\cos(2\alpha_1+2\alpha_2)-\cos(2\alpha_1)]\sin\gamma_2$ (13)

in the above derivation, $\tau_{c12}(\alpha_1,\alpha_2)$ and $\tau_{c23}(\alpha_1,\alpha_2)$ are the dimensionless coupling torques between motor 1 and motor 2 and between motor 2 and motor 3 respectively, and the constraint functions thereof are as follows:

$|\tau_{c12}(\overline{\alpha}_1,\overline{\alpha}_2)| \leq \tau_{c12\,max}$ $|\tau_{c23}(\overline{\alpha}_1,\overline{\alpha}_2)| \leq \tau_{c23\,max}$ (14)

to sum up, and combined with the above formula, the synchronization criterion of the three exciters can be obtained:

$\left|\dfrac{\Delta T_{012}}{T_u}\right| \leq \tau_{c12max}, \left|\dfrac{\Delta T_{023}}{T_u}\right| \leq \tau_{c23max}$ (15)

the above formula shows that the absolute value of the difference between the dimensionless residual torques of any two exciters should be less than or equal to the maximum value of the dimensionless coupling torque;

step 3: stability criterion of synchronization status obtaining the kinetic energy T and potential energy V of the whole system, which are respectively:

$T = \dfrac{1}{2}\Big[M_1(\dot{x}_1^2+\dot{y}_1^2)+M_2(\dot{x}_2^2+\dot{y}_2^2)+M_3(\dot{x}_3^2+\dot{y}_3^2)+M_4(\dot{x}_4^2+\dot{y}_4^2)+3m_0r^2\omega_0^2+J\dot{\psi}^2\Big]$ (19)

$V = \dfrac{1}{2}\{k_1[(x_1-x_4)^2+(y_1-y_4)^2]+k_2[(x_2-x_4)^2+(y_2-y_4)^2]+k_3[(x_3-x_4)^2+(y_3-y_4)^2]+k_4[(x_4)^2+(y_4)^2]\}$ (20)

average kinetic energy $E_T$ and average potential energy $E_V$ can be obtained in a single cycle, and average Hamilton action I of the system in one cycle is:

$I = \dfrac{1}{2\pi}\int_0^{2\pi}(T-V)d\phi = E_T - E_v$ (21)

expressing the Hesse matrix of I as H to obtain:

$H = \begin{bmatrix} d_{11} & d_{12} \\ d_{21} & d_{22} \end{bmatrix}$ where $d_{11} =$ $\dfrac{\partial^2 I}{\partial \overline{\alpha}_1^2} = -2r^2\{[4k_0F_1F_4\cos(\gamma_1-\gamma_4)+8k_0F_2F_4\cos(\gamma_2-\gamma_4)+4\omega_{m0}^2M_0F_1F_2\cos(\gamma_1-\gamma_2)-4k_0F_1F_2\cos(\gamma_1-\gamma_2)+2\omega_{m0}^2M_0F_2^2+2\omega_{m0}^2M_4F_4^2-2k_0F_2^2-6k_0F_4^2]\times[\cos(2\alpha_1)+\cos(2\alpha_1+2\alpha_2)]+\omega_{m0}^2JF_{13}^2[\cos(2\alpha_1-\beta_1+\beta_2)+\cos(2\alpha_1+2\alpha_2-\beta_1+\beta_3)]\}$ $d_{12} = d_{21} = \dfrac{\partial^2 I}{\partial\alpha_1\partial\alpha_2} = -2r^2$
$\{[4\omega_{m0}^2M_0F_1F_2\cos(\gamma_1-\gamma_2)+4k_0F_1F_4\cos(\gamma_1-\gamma_4)+8k_0F_2F_4\cos(\gamma_2-\gamma_4)-4k_0F_1F_2\cos(\gamma_1-\gamma_2)+2\omega_{m0}^2M_4F_4^2+2\omega_{m0}^2M_0F_2^2-2k_0F_2^2-6k_0F_4^2]\cos(2\alpha_1+2\alpha_2)+\omega_{m0}^2JF_{13}^2\cos(2\alpha_1+2\alpha_2-\beta_1+\beta_3)\}$ $d_{22} = \dfrac{\partial^2 I}{\partial \overline{\alpha}_2^2} = -2r^2\{[8k_0F_2F_4\cos(\gamma_2-\gamma_4)+4\omega_{m0}^2M_0F_1F_2\cos(\gamma_1-\gamma_2)-4k_0F_1F_4\cos(\gamma_1-\gamma_4)+-4k_0F_1F_2\cos(\gamma_1-\gamma_2)+2\omega_{m0}^2M_0F_2^2+2\omega_{m0}^2M_4F_4^2-2k_0F_2^2-6k_0F_4^2]\times[\cos(2\alpha_2)+\cos(2\alpha_1+2\alpha_2)]+\omega_{m0}^2JF_{13}^2[\cos(2\alpha_2-\beta_2+\beta_3)+\cos(2\alpha_1+2\alpha_2-\beta_1+\beta_3)]\}$ letting $H_1 = d_{11}$ $H_2 = d_{11}d_{22} - d_{12}d_{21}$ the H matrix is positive definite and satisfies:

$$H_1>0, H_2>0 \tag{23}$$

defining $H_1$ and $H_2$ as the stability capability coefficients of the system in synchronization condition, the above formulas are the expressions of the stability capability of the system, and when the above formulas (23) are satisfied, the system is stable; and setting physical exciters based on the determined parameters of the high-frequency vibrating mill to reduce the loss of the physical exciters.

2. The method for determining parameters of a high-frequency vibrating mill with three grinding drums according to claim 1, wherein $T_{L1}$, $T_{L2}$ and $T_{L3}$ are summed and divided by $3T_u$ to obtain the average dimensionless load torque of the three exciters, which is expressed as $\tau_a(\alpha_1,\alpha_2)$;

$$\tau_a = \frac{1}{3T_u}\sum_{i=1}^{3}T_{Li} = \frac{1}{3}\{4F_2\sin\gamma_2[\cos(2\alpha_1+2\alpha_2)+\cos(2\alpha_1)+\cos 2\alpha_2)] - \tag{16}$$

-continued $$2l_0 F_{13}\sin\gamma_{13}[\cos(2\alpha_1+2\alpha_2-\beta_1+\beta_3)+\cos(2\alpha_1-\beta_1+\beta_2)+ \\ \cos(2\alpha_2-\beta_2+\beta_3)]+6F_1\sin\gamma_1-3l_0F_{13}\sin\gamma_{13}\}$$

the constraint function of the average dimensionless load torque of the three exciters is as follows:

$$|\tau_a(\alpha_1,\alpha_2)|\le\tau_{a\,max} \tag{17}$$

the synchronization capability coefficient is defined as $\zeta_{ij}$ (i, j=1, 2, 3, 4), denoted by:

$$\zeta_{12}=\frac{\tau_{c12max}}{\tau_{a\,max}},\ \zeta_{23}=\frac{\tau_{c23max}}{\tau_{a\,max}} \tag{18}$$

increasing the synchronization capability of the system by increasing the synchronization capability coefficient.

* * * * *